(12) United States Patent
Suwa et al.

(10) Patent No.: US 9,944,102 B2
(45) Date of Patent: Apr. 17, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Tetsuya Suwa, Yokohama (JP); Shinjiro Hori, Yokohama (JP); Tomokazu Ishikawa, Yokohama (JP); Wakako Tanaka, Inagi (JP); Tohru Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/482,183

(22) Filed: Apr. 7, 2017

(65) Prior Publication Data
US 2017/0313111 A1    Nov. 2, 2017

(30) Foreign Application Priority Data

Apr. 27, 2016    (JP) .................................. 2016-089928

(51) Int. Cl.
*B41J 29/38*    (2006.01)
*H04N 19/124*    (2014.01)

(52) U.S. Cl.
CPC ............ *B41J 29/38* (2013.01); *H04N 19/124* (2014.11)

(58) Field of Classification Search
CPC .............................. B41J 29/38; A01B 12/006
See application file for complete search history.

(56) References Cited

U.S. PATENT DOCUMENTS

| | | | |
|---|---|---|---|
| 6,608,926 B1 * | 8/2003 | Suwa ...................... | G06T 5/009 358/520 |
| 6,694,051 B1 * | 2/2004 | Yamazoe ................ | G06T 5/009 358/1.9 |
| 7,031,511 B2 | 4/2006 | Asai | |

(Continued)

FOREIGN PATENT DOCUMENTS

JP    2013-185862    9/2013

OTHER PUBLICATIONS

U.S. Appl. No. 15/493,526, filed Apr. 21, 2017.

(Continued)

*Primary Examiner* — Lamson Nguyen
(74) *Attorney, Agent, or Firm* — Fitzpatrick, Cella, Harper & Scinto

(57) ABSTRACT

An image processing apparatus includes a setting unit, an averaging unit, a determination unit, a quantization unit, an addition unit and a detection unit. The averaging unit divides image data based on a division size and phase set by the setting unit to subject pixels included in the resultant respective division regions to an averaging processing to calculate an average value. The quantization unit configured to obtain a quantization value for each of the plurality of pixels. The addition unit adds the quantization values, that are obtained so that at least one of the division size and the phase is different from the other, to generate addition image data. The determination unit determines the quantization threshold value so that the quantization threshold value in a case where the division size is a first size is higher than the quantization threshold value in a case where the division size is a second size larger than the first size.

24 Claims, 20 Drawing Sheets

(56) References Cited

U.S. PATENT DOCUMENTS

| | | |
|---|---|---|
| 8,503,031 B2 | 8/2013 | Kajihara |
| 8,619,319 B2 | 12/2013 | Tsuchiya |
| 8,830,530 B2 | 9/2014 | Sano |
| 9,064,202 B2 | 6/2015 | Tanaka |
| 9,087,291 B2 | 7/2015 | Hori |
| 9,092,720 B2 | 7/2015 | Nakagawa |
| 9,210,292 B2 | 12/2015 | Miyake |
| 9,636,937 B2 | 5/2017 | Ikeda |
| 9,649,839 B2 | 5/2017 | Ishikawa |
| 9,769,352 B2 * | 9/2017 | Yanai ................ H04N 1/40 |
| 2015/0109435 A1 | 4/2015 | Ito |
| 2017/0001432 A1 | 1/2017 | Ishikawa |
| 2017/0001446 A1 | 1/2017 | Kagawa |
| 2017/0004360 A1 | 1/2017 | Tanaka |
| 2017/0004375 A1 | 1/2017 | Ikeda |
| 2017/0004376 A1 | 1/2017 | Hori |
| 2017/0004614 A1 | 1/2017 | Suwa |

OTHER PUBLICATIONS

Kimiya Aoki, et al., "'Kizuki' Processing for Visual Inspection, A Smart Pattern Pop-out Algorithm based on Human Visual Architecture", Aug. 24, 2014, 22nd International Conference on Pattern Recognition, pp. 2317-2322.

European Search Report dated Oct. 4, 2017 during prosecution of related European application No. 17000595.3.

Aoki, Kimiya, et al., "KIZUKI" Algorithm inspired by Peripheral Vision and Involuntary Eye Movement, Journal of the Japan Society for Precision Engineering, vol. 79, No. 11, 2013, pp. 1045-1049 (English-language abstract included).

\* cited by examiner

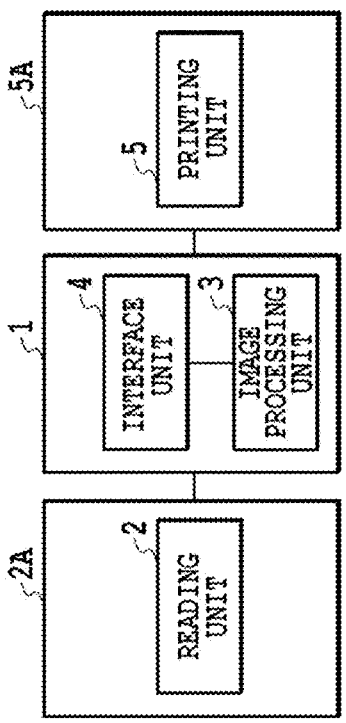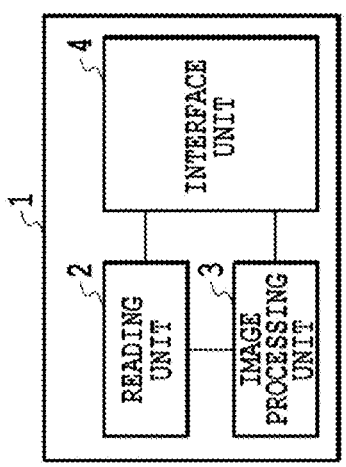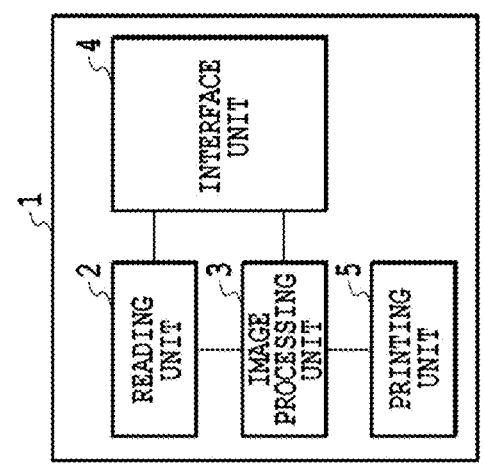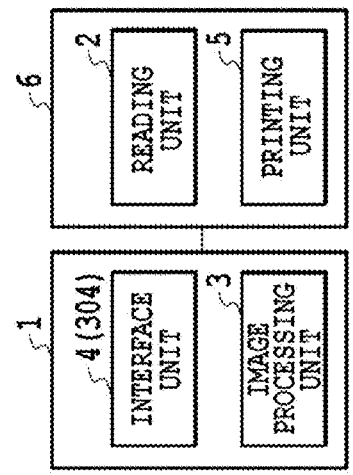

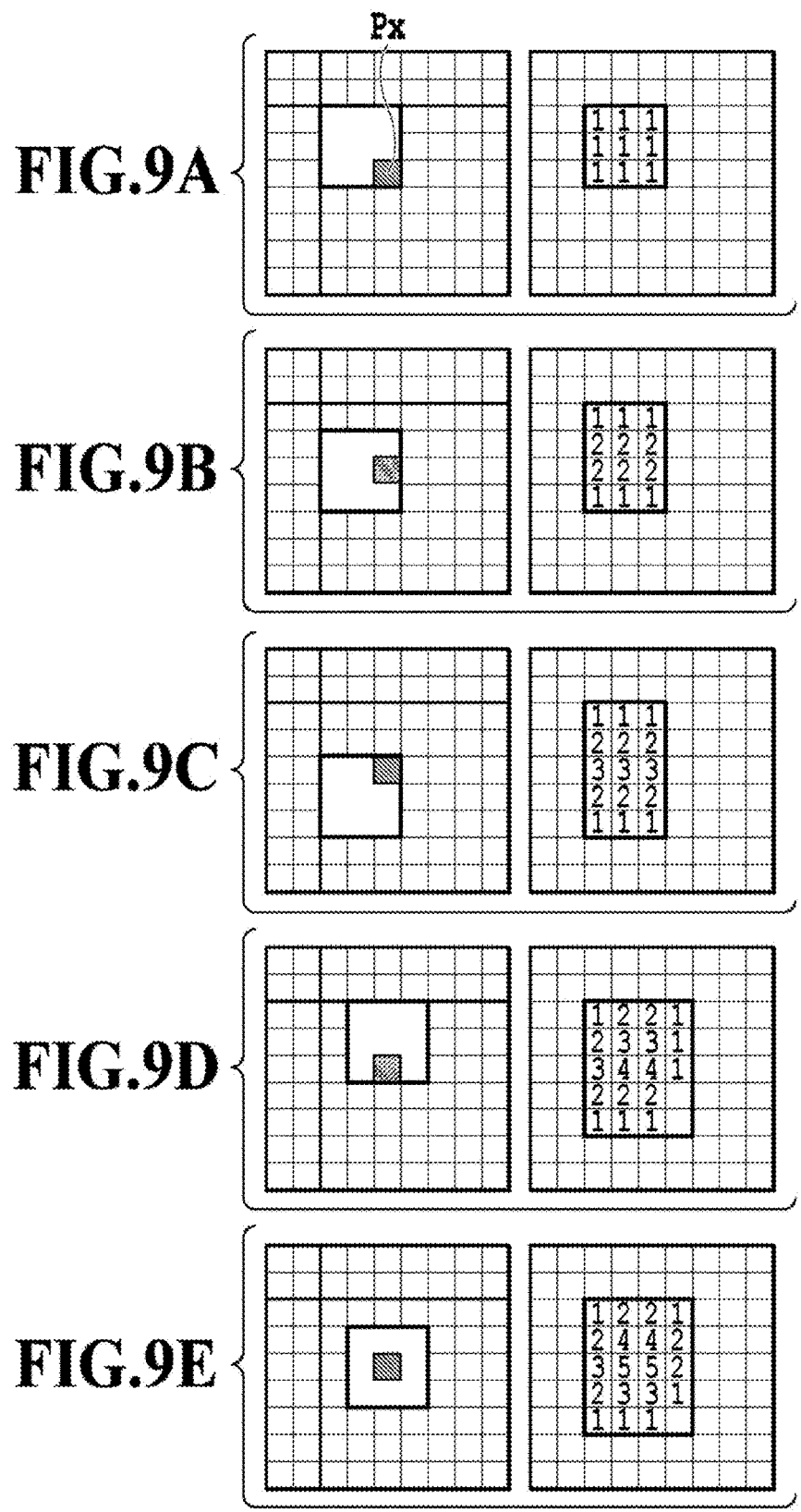

IMAGE PROCESSING APPARATUS, IMAGE PROCESSING METHOD, AND STORAGE MEDIUM

BACKGROUND OF THE INVENTION

Field of the Invention

The present invention relates to an image processing apparatus and an image processing method to extract a singular portion in an inspection object.

Description of the Related Art

Japanese Patent Laid-Open No. 2013-185862 and "KIZUKI" Algorithm inspired by Peripheral Vision and Involuntary Eye Movement", Journal of the Japan Society for Precision Engineering, Vol. 79, No. 11, 2013, p. 1045-1049 (hereinafter referred to as the above Nonpatent Document) disclose an algorithm to detect a singular portion such as a flaw in an inspection object based on a human visual mechanism. Specifically, an inspection object is image-taken and then the resultant image is divided to division regions having a predetermined size and the individual division regions are subjected to averaging and quantization processings. Then, such processings are performed on a plurality of division regions having different sizes or phases. Based on the result of integrating these quantization values, the existence or nonexistence of a defect or the position thereof is determined. Such a processing disclosed in Japanese Patent Laid-Open No. 2013-185862 and the above Nonpatent Document will be herein referred to as a processing of peripheral vision and involuntary eye movement during fixation.

Japanese Patent Laid-Open No. 2013-185862 and the above Nonpatent Document disclose method according to which a singular portion extracted by the processing of peripheral vision and involuntary eye movement during fixation can be further enlarged or colored and the existence of resultant image can be displayed in an exaggerated manner (or in a popped up manner). By performing the popup processing, an inspector can recognize even a minute flaw in an object.

When the processing of peripheral vision and involuntary eye movement during fixation is used, a level at which a singular portion is exaggerated in an image depends on the size of a division region in the averaging processing and a threshold value used in the quantization processing. In particular, with the increase of the division region or with the decrease of the quantization threshold value, a singular portion is more conspicuous in an image obtained through the processing of peripheral vision and involuntary eye movement during fixation.

However, if the division region is enlarged to a more-than-necessary size or the quantization threshold value is reduced to a less-than-necessary value, then the sensitivity to the singular portion extraction is excessively high, disadvantageously causing a risk where even minute noise that should not be detected is popped up. Such noise may exist in the inspection object itself or may be caused by an error or signal noise during the image-taking operation. If such minute noise is popped up unintendedly, then a step of reconfirming the popped-up region is required, which disadvantageously causes an increased burden on the inspector, thereby undesirably causing a decreased inspection efficiency.

SUMMARY OF THE INVENTION

The present invention has been made in order to solve the above disadvantage. Thus, it is an objective of the invention to provide an image processing apparatus that can effectively detect a target singular portion while using the processing of peripheral vision and involuntary eye movement during fixation and without causing the extraction of smaller-than-necessary defect or noise.

According to a first aspect of the present invention, there is provided an image processing apparatus, comprising: an acquisition unit configured to acquire image data having a plurality of pixels, that is obtained by image-taking an object; a setting unit configured to set a division size for dividing the image data to a plurality of division regions and a phase of a division position of the image data before the dividing; an averaging unit configured to divide the image data based on the division size and phase set by the setting unit to subject pixels included in the resultant respective division regions to an averaging processing to calculate an average value; a determination unit configured to determine a quantization threshold value based on the division size set by the setting unit; a quantization unit configured to obtain a quantization value for each of the plurality of pixels by comparing the average value calculated by the averaging unit with the quantization threshold value determined by the determination unit; an addition unit configured to add the quantization values, that are obtained so that at least one of the division size and the phase is different from the other, to generate addition image data; and a detection unit configured to detect a singular portion from the addition image data, wherein the determination unit determines the quantization threshold value so that the quantization threshold value in a case where the division size is a first size is higher than the quantization threshold value in a case where the division size is a second size larger than the first size.

According to a second aspect of the present invention, there is provided an image processing apparatus, comprising: an acquisition unit configured to acquire image data having a plurality of pixels, that is obtained by image-taking an object; a setting unit configured to set a filter size and a filter parameter for subjecting the image data to a predetermined filter processing; a filter processing unit configured to subject, based on the filter size and filter parameter set by the setting unit, the image data to the predetermined filter processing to calculate a processing value; a determination unit configured to determine a quantization threshold value based on the filter size set by the setting unit; a quantization unit configured to obtain a quantization value for each of the plurality of pixels by comparing the processing value calculated by the filter processing unit with the quantization threshold value determined by the determination unit; an addition unit configured to add the quantization values, that are obtained so that at least one of the filter size and the filter parameter is different from the other, to generate addition image data; and a detection unit configured to detect a singular portion from the addition image data, wherein the determination unit determines the quantization threshold value so that the quantization threshold value in a case where the filter size is a first size is higher than the quantization threshold value in a case where the filter size is a second size larger than the first size.

According to a third aspect of the present invention, there is provided an image processing method, comprising: an acquisition step of acquiring image data having a plurality of pixels, that is obtained by image-taking an object; a setting step of setting a division size for dividing the image data to a plurality of division regions and a phase of a division position of the image data before the dividing; an averaging step of dividing the image data based on the division size and phase set by the setting step to subject pixels included in the resultant respective division regions to an averaging processing to calculate an average value; a determination step of determining a quantization threshold value based on the division size set by the setting step; a quantization step of obtaining a quantization value for each of the plurality of pixels by comparing the average value calculated by the averaging step with the quantization threshold value determined by the determination step; an addition step of adding the quantization values, that are obtained so that at least one of the division size and the phase is different from the other, to generate addition image data; and a detection step of detecting a singular portion from the addition image data, wherein the determination step determines the quantization threshold value so that the quantization threshold value in a case where the division size is a first size is higher than the quantization threshold value in a case where the division size is a second size larger than the first size.

According to a fourth aspect of the present invention, there is provided an image processing method, comprising: an acquisition step of acquiring image data having a plurality of pixels, that is obtained by image-taking an object; a setting step of setting a filter size and a filter parameter for subjecting the image data to a predetermined filter processing; a filter processing step of subjecting, based on the filter size and filter parameter set by the setting step, the image data to the predetermined filter processing to calculate a processing value; a determination step of determining a quantization threshold value based on the filter size set by the setting step; a quantization step of obtain a quantization value for each of the plurality of pixels by comparing the processing value calculated by the filter processing step with the quantization threshold value determined by the determination step; an addition step of adding the quantization values, that are obtained so that at least one of the filter size and the filter parameter is different from the other, to generate addition image data; and a detection step of detecting a singular portion from the addition image data, wherein the determination step determines the quantization threshold value so that the quantization threshold value in a case where the filter size is a first size is higher than the quantization threshold value in a case where the filter size is a second size larger than the first size.

According to a fifth aspect of the present invention, there is provided an non-transitory computer-readable storage medium which stores a program for allowing a computer to function as an image processing apparatus, the image processing apparatus comprising: an acquisition unit configured to acquire image data having a plurality of pixels that is obtained by image-taking an object; a setting unit configure to set a division size for dividing the image data to a plurality of division regions and a phase of a division position of the image data before the dividing; an averaging unit configured to divide the image data based on the division size and phase set by the setting unit to subject pixels included in the resultant respective division regions to an averaging processing to calculate an average value; a determination unit configured to determine a quantization threshold value based on the division size set by the setting unit; a quantization unit configured to obtain a quantization value for each of the plurality of pixels by comparing the average value calculated by the averaging unit with the quantization threshold value determined by the determination unit; an addition unit configured to add the quantization values, that are obtained so that at least one of the division size and the phase is different from the other, to generate addition image data; and a detection unit configured to detect a singular portion from the addition image data, wherein the determination unit determines the quantization threshold value so that the quantization threshold value in a case where the division size is a first size is higher than the quantization threshold value in a case where the division size is a second size larger than the first size.

Further features of the present invention will become apparent from the following description of exemplary embodiments with reference to the attached drawings.

BRIEF DESCRIPTION OF THE DRAWINGS

FIGS. 1A to 1D illustrate an embodiment of an image processing apparatus;

FIGS. 9A to 9J are a schematic view illustrating a process of sequentially performing the addition processing on all phases;

DESCRIPTION OF THE EMBODIMENTS

Figure 2:
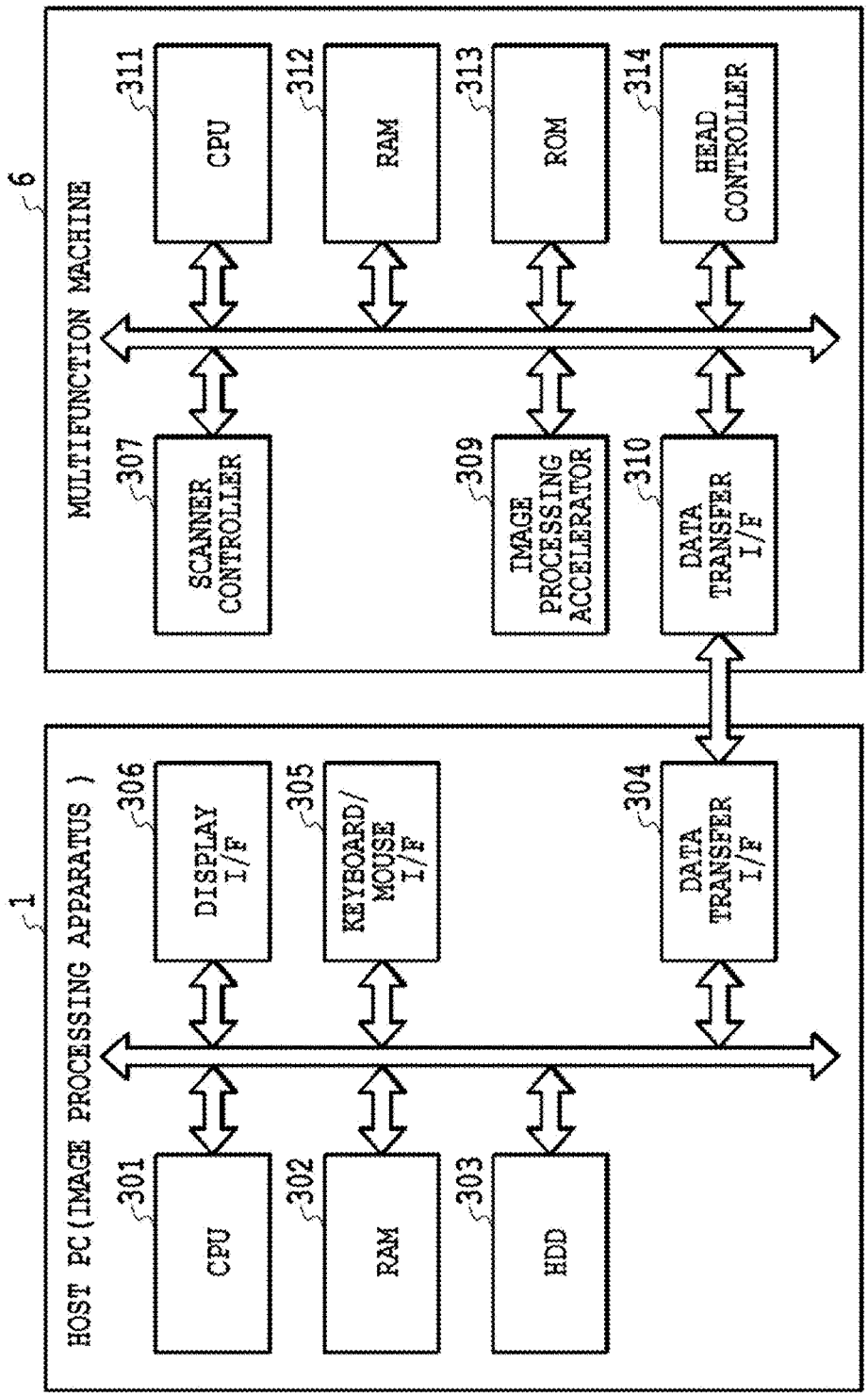
FIG. 2 is a block diagram for explaining a control configuration.

FIGS. 1A to 1D illustrate an example of an image processing apparatus 1 that can be used in the present invention. The image processing apparatus of the present invention subjects image-taken image data to a pop-up processing to allow a defect portion of a printed image to be easily recognized by a user or a processing to for the decision by the apparatus itself and can take various forms of systems.

FIG. 1A illustrates an embodiment in which the image processing apparatus 1 includes a reading unit 2. For example, this corresponds to a case where a sheet on which a predetermined image is printed by the inkjet printing apparatus is placed on the reading base of the reading unit 2 in the image processing apparatus 1 and is image-taken by an optical sensor for example and the image data is processed by an image processing unit 3. The image processing unit 3 includes a CPU or an image processing accelerator capable of providing a processing at a higher speed than this to control the reading operation by the reading unit 2 or to subject received image data to a predetermined inspection processing.

FIG. 1B shows an embodiment in which a reading apparatus 2A including the reading unit 2 is externally connected to the image processing apparatus 1. For example, this corresponds to a system in which a scanner is connected to a PC for example. The connection method may include general-purpose connection methods such as USB, GigE, or CameraLink. The image data read by the reading unit 2 is provided via an interface 4 to the image processing unit 3. The image processing unit 3 subjects the received image data to a predetermined inspection processing. In the case of this embodiment, the image processing apparatus 1 also may be further externally connected to a printing apparatus 5A including a printing unit 5.

FIG. 1C shows an embodiment in which the image processing apparatus 1 includes the reading unit 2 and the printing unit 5. For example, this corresponds to a multifunction machine including a scanner function, a printer function, and an image processing function. The image processing unit 3 controls all of the printing operation in the printing unit 5, the reading operation in the reading unit 2, and the inspection processing to the image read by the reading unit 2 for example.

FIG. 1D illustrates an embodiment in which a multifunction machine 6 including the reading unit 2 and the printing unit 5 is externally connected to the image processing apparatus 1. For example, this corresponds to a system in which a multifunction machine including a scanner function and a printer function is connected to a PC for example.

The image processing apparatus 1 of the present invention also can use any of the embodiments of FIGS. 1A to 1D. The following section will describe in detail an embodiment of the present invention via an example of the case where the embodiment of FIG. 1D is used.

First Embodiment

FIG. 2 is a block diagram to explain the control configuration in the embodiment of FIG. 1D. The image processing apparatus 1 composed of a host PC for example. A CPU 301 executes various processings based on a program retained in an HDD 303 and using a RAM 302 as a work area. For example, the CPU 301 generates image data that can be printed by the multifunction machine 6 based on a command received from a user via a keyboard/mouse I/F 305 or a program retained in the HDD 303 to send this to the multifunction machine 6. The image data received from the multifunction machine 6 via a data transfer I/F 304 is subjected to a predetermined processing based on the program stored in the HDD to display the result or various pieces of information on a not-shown display via a display I/F 306.

In the multifunction machine 6, a CPU 311 executes various kind of processing based on a program retained in a ROM 313 and using a RAM 312 as a work area. The multifunction machine 6 further includes an image processing accelerator 309 for performing a high-speed image processing, a scanner controller 307 for controlling the reading unit 2, and a head controller 314 for controlling the printing unit 5.

The image processing accelerator 309 is hardware that can perform the image processing at a speed higher than that of the CPU 311. The image processing accelerator 309 is activated by allowing the CPU 311 to write data and parameters required for the image processing to the predetermined address of the RAM 312. After the parameters and data are read, the data is subjected to the predetermined image processing. However, the image processing accelerator 309 is not always required and thus a similar processing can be carried out by the CPU 311.

The head controller 314 supplies printing data to a printing head 100 provided in the printing unit 5 and controls the printing operation of the printing head 100. The head controller 314 is activated by allowing the CPU 311 to write printing data that can be printed by the printing head 100 and control parameters to the predetermined address of the RAM 312 and executes an ejection operation based on the printing data.

The scanner controller 307 outputs, while controlling the individual reading elements arranged in the reading unit 2, RGB brightness data obtained therefrom to the CPU 311. The CPU 311 transfers the resultant RGB brightness data via a data transfer I/F 310 to the image processing apparatus 1. The data transfer I/F 304 of the image processing apparatus 1 and the data transfer I/F 310 of the multifunction machine 6 may be connected by USB, IEEE1394, or LAN for example.

Figure 3:
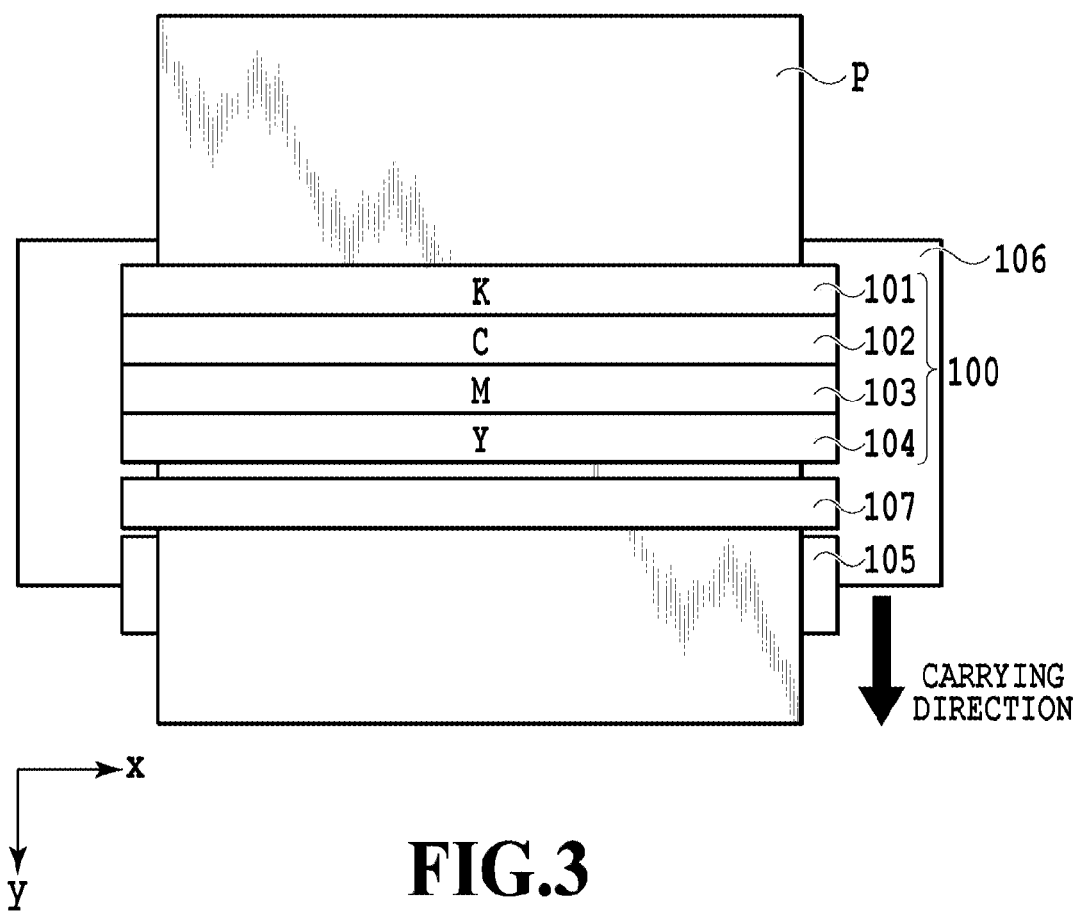
FIG. 3 is a schematic view illustrating the configuration of an inkjet printing apparatus.

FIG. 3 is a schematic view illustrating the configuration of an inkjet printing apparatus that can be used as the multifunction machine 6 of this embodiment (hereinafter also may be simply referred to as a printing apparatus). The printing apparatus of this embodiment is a full line-type printing apparatus in which the printing head 100 and a reading head 107 having the same width as that of a printing medium or the sheet P that may be an inspection object are arranged in parallel to each other. The printing head 100 has four printing element arrays 101 to 104 through which inks of black (K), cyan (c), magenta (M), and yellow (Y) are ejected, respectively. These printing element arrays 101 to 104 are arranged to be parallel to one another in the direction along which the sheet P is carried (Y direction). At the further downstream side of the printing element arrays 101 to 104, the reading head 107 is provided. The reading head 107 has reading elements arranged in the X direction in order to read a printed image.

When a printing processing or a reading processing is performed, then the sheet P is carried in the shown Y direction at a predetermined speed in accordance with the rotation of a conveying roller 105. During this conveying operation, the printing processing by the printing head 100 or the reading processing by the reading head 107 is performed. The sheet P at a position at which the printing processing by the printing head 100 or the reading processing by the reading head 107 is performed is supported by a platen 106 consisting of a flat plate from the lower side to maintain the distance from the printing head 100 or the reading head 107 and the smoothness.

Figure 4A:
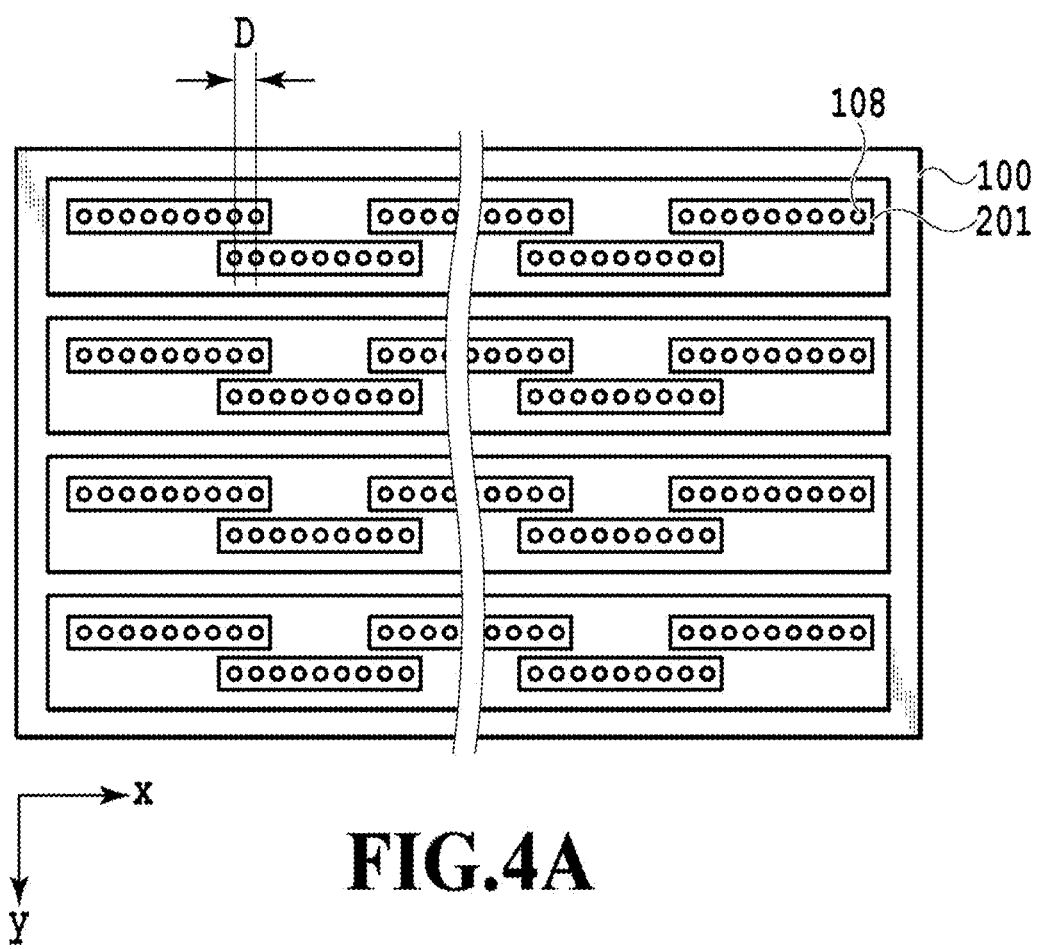
FIGS. 4A and 4B illustrate the arrangement configuration of printing elements and the arrangement configuration of reading elements.
Figure 4B:
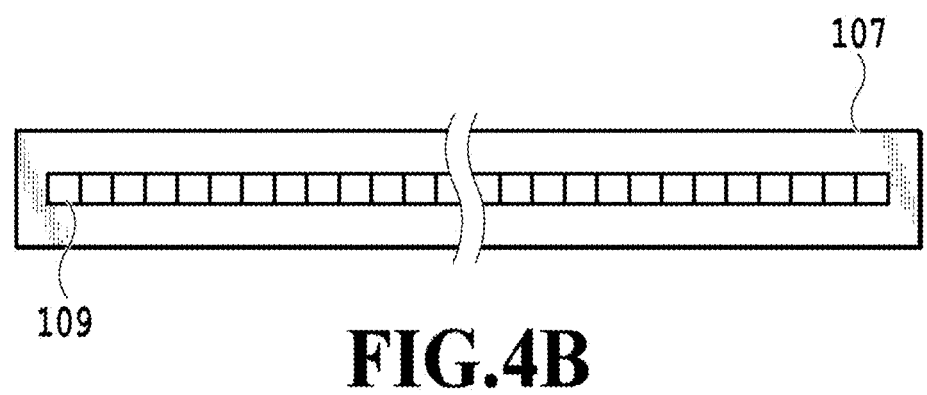

FIGS. 4A and 4B illustrate the arrangement configuration of the printing elements in the printing head 100 and the arrangement configuration of the reading elements in the reading head 107. The printing head 100 is configured so that the respective printing element arrays 101 to 104 corresponding to the respective ink colors have a plurality of printing element substrate 201 on which a plurality of printing elements 108 are arranged at a fixed pitch are alternately provided in the Y direction so as to be continuous in the X direction while having an overlapped region D. To the sheet P carried in the Y direction at a fixed speed, the ink is ejected from the individual printing element 108 based on the printing data at a fixed frequency to thereby print, on the sheet P, an image having a resolution corresponding to a pitch at which the printing elements 108 are arranged.

On the other hand, the reading head 107 has a plurality of reading sensors 109 arranged in the X direction at a predetermined pitch. Although not shown, the individual reading sensor 109 is configured so that reading elements that may be a minimum reading pixel unit are arranged in the X direction. The image on the sheet P conveyed at a fixed speed in the Y direction can be image-taken by the reading elements of the individual reading sensor 109 at a predetermined frequency, thereby allowing the entire image printed on the sheet P to be read at a pitch at which the reading elements are arranged.

The following section will describe the singular portion detection processing in this embodiment. The singular portion detection processing of this embodiment is a processing to image-take an already-printed image to subject the resultant image data to a predetermined image processing to extract (detect) a singular portion such as a defect. An image printing is not limited to an inkjet printing by an apparatus as the multifunction machine 6. However, the following section will describe a case where an image printed by the printing head 100 of the multifunction machine 6 is read by the reading head 107.

Figure 5:
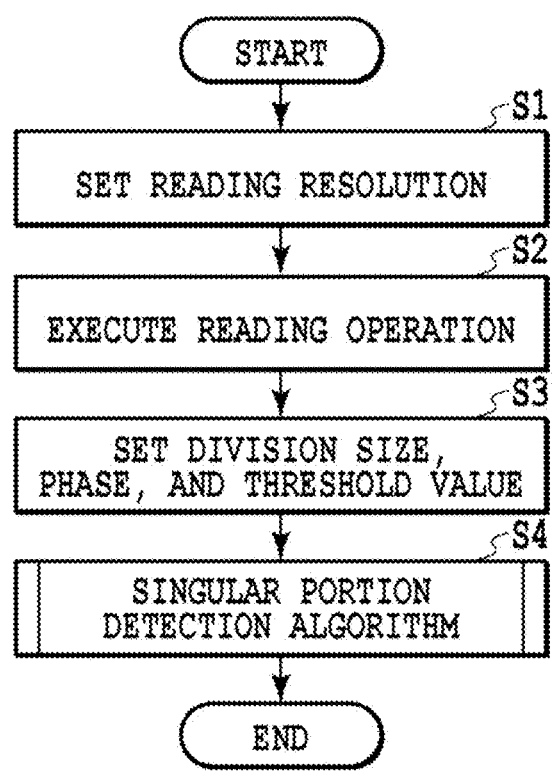
FIG. 5 is a flowchart to explain the basic steps of a singular portion detection processing.

FIG. 5 is a flowchart to explain the basic steps of the singular portion detection processing executed by the CPU 301 in the image processing apparatus 1 of this embodiment. When this processing is started, then the CPU 301 sets the reading resolution in Step S1. The resolution is set so that the size of a target defect can be appropriately read. The resolution is desirably set so that the defect portion can be read using a plurality of pixels or more.

Next, in Step S2, based on the reading resolution set in Step S1, an operation is executed to read an image as the inspection target. Specifically, the scanner controller 307 is driven to obtain output signals from a plurality of reading elements arranged in a reading sensor 109. Based on this, image data corresponding to the reading resolution set in Step S1 is generated. In this embodiment, the image data is brightness signals of R(red), G(green), and B(blue).

In Step S3, the CPU 301 sets a division size, a phase, and a quantization threshold value used in the singular portion detection algorithm executed in the subsequent Step S4. The definitions of the division size and the phase will be described in detail later. In Step S3, one type or more of each of the division size and the phase is set. For the quantization threshold value, two types of the maximum value and the minimum value are set. In Step S4, based on the division size, the phase, and the quantization threshold value set in Step S3, the image data generated in Step S2 is subjected to the singular portion detection algorithm.

Figure 6:
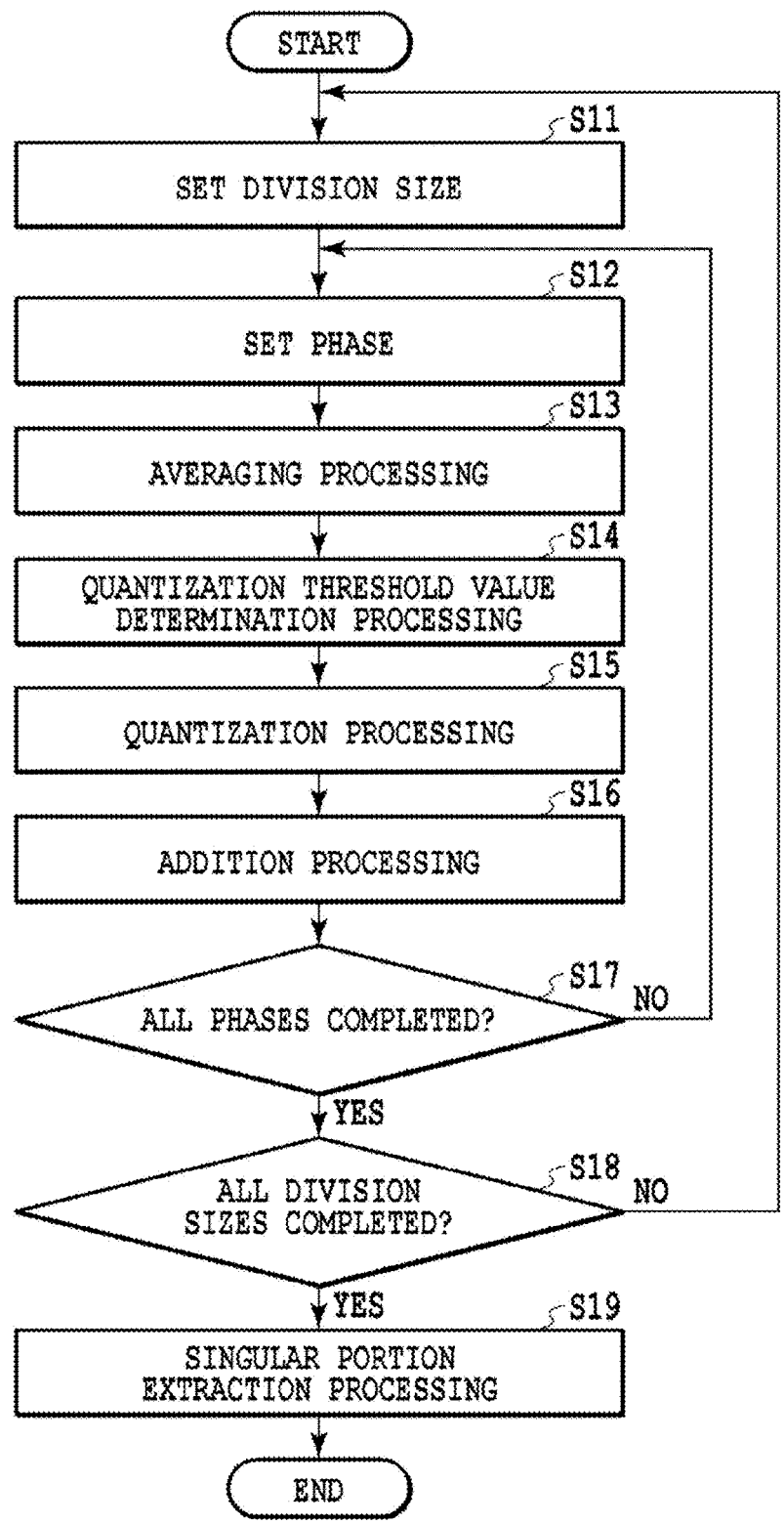
FIG. 6 is a flowchart to explain the steps of a singular portion detection algorithm.

FIG. 6 is a flowchart to explain the steps of the singular portion detection algorithm executed by the CPU 301 in Step S4. When this processing is started, the CPU 301 firstly sets, in Step S11, one division size from among a plurality of division sizes set in Step S3. In Step S12, one phase is set from among a plurality of phases set in Step S3. In Step S13, based on the division size set in Step S11 and the phase set in Step S12, the image data acquired in Step S2 is divided and an averaging processing is performed.

Figure 7A:
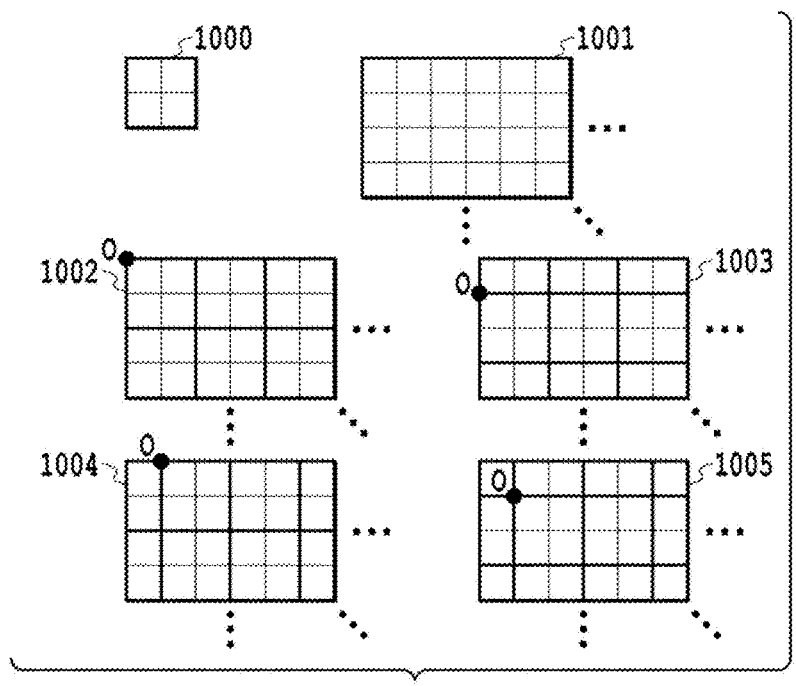
FIGS. 7A and 7B are a diagram to explain the division status of image data.
Figure 7B:
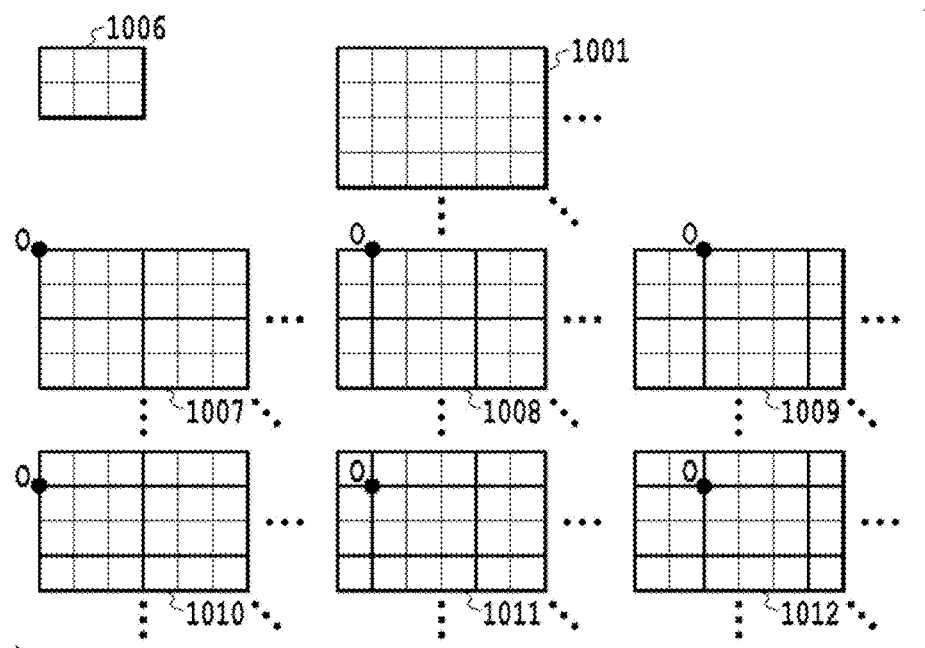
Figure 8A:
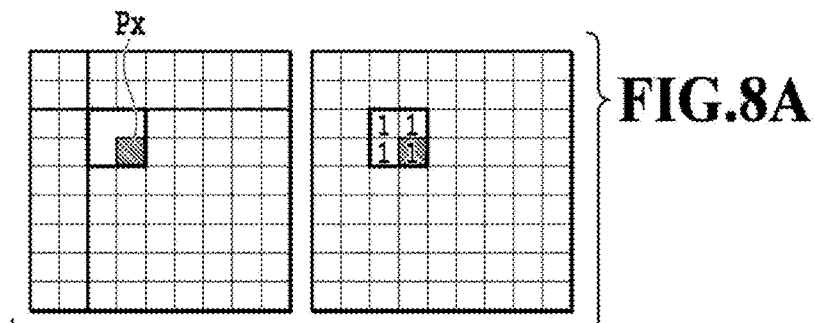
FIGS. 8A to 8E are a schematic view illustrating a process of sequentially performing an addition processing on all phases.
Figure 8B:
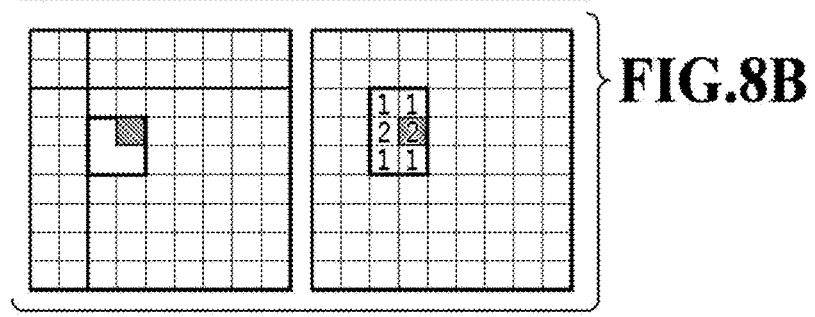
Figure 8C:
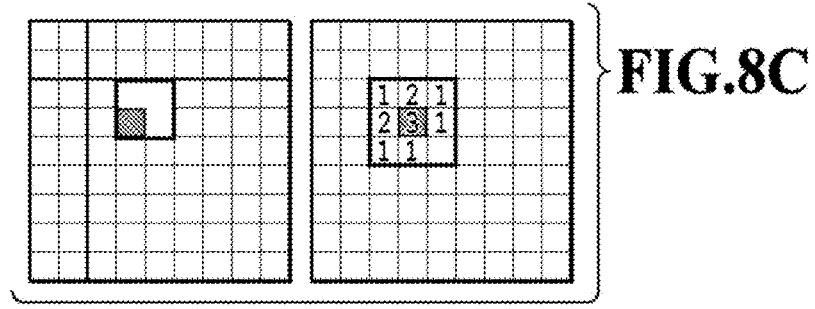
Figure 8D:
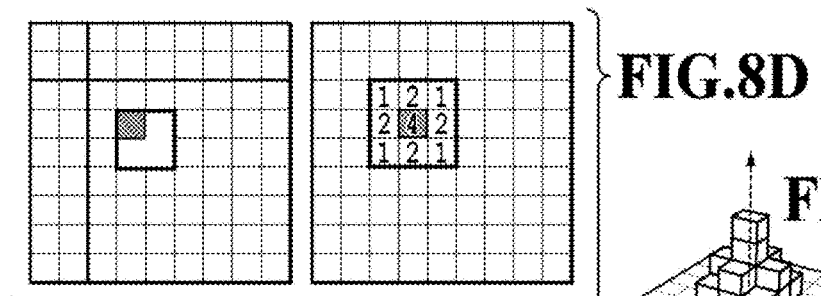
Figure 8E:
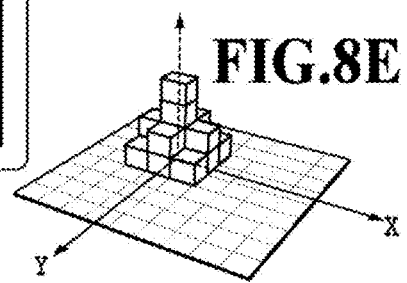
Figure 9F:
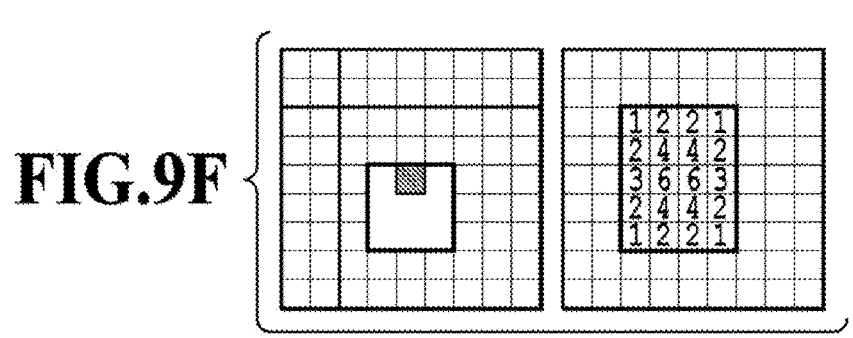
Figure 9G:
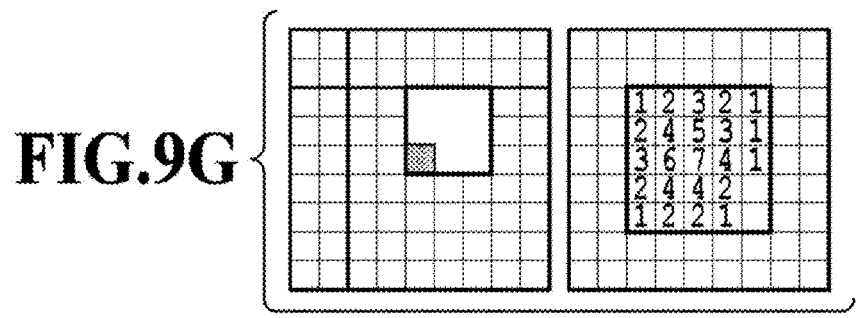
Figure 9H:
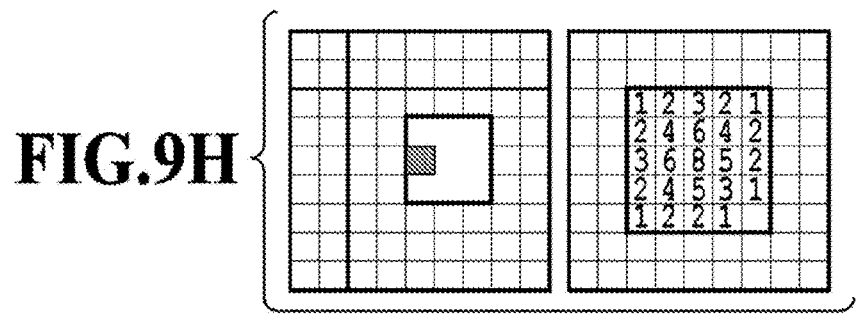
Figure 9I:
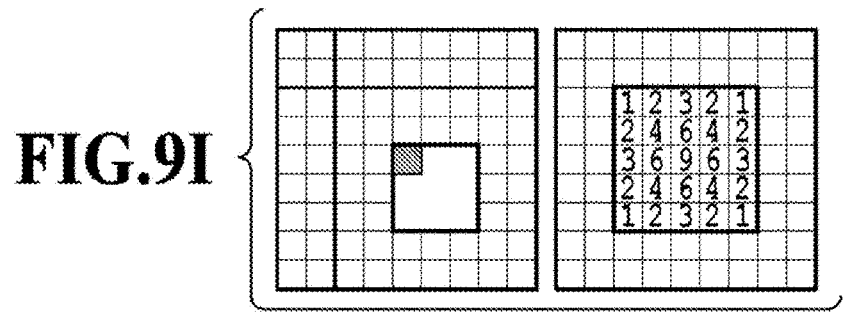
Figure 9J:
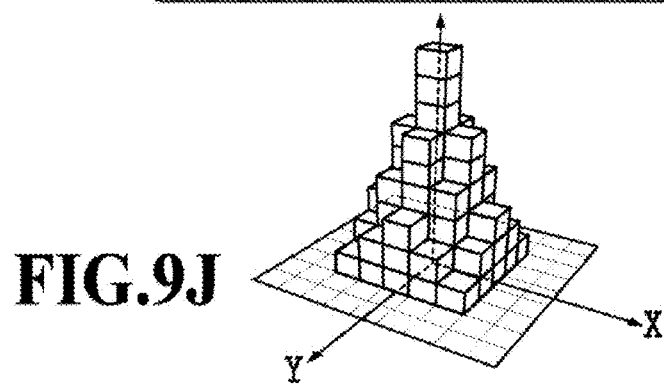

FIGS. 7A and 7B are a diagram to explain the division status of the image data based on the division size and the phase. FIG. 7A shows a case where the division size is 2×2 pixels while FIG. 7B shows a case where the division size is 3×2 pixels, respectively. When the division size 1000 is 2×2 pixel as in FIG. 7A, the image data region 1001 is divided based on a unit of 2×2 pixels and can be divided in a four ways of 1002 to 1005. Thus, a phase can be considered as showing a starting point O of a specified division size. When the division size 1006 is 3×2 pixels as in FIG. 7B, the image data region 1001 can be divided in 6 ways of 1007 to 1012, meaning the existence of 6 types of phases.

An increase of the division size provides a higher number of phases that can be set. However, all phases are not always required to be set for one division size. In Step S3 of FIG. 5, at least phase(s) among the phases that can be set may be set. In Step S12 of FIG. 6, one of some phases set in Step S3 may be set.

Returning to FIG. 6, in Step S13, the respective division regions divided in Step S12 are subjected to the averaging processing. Specifically, the average value of the brightness data of individual pixel is calculated for a plurality of pixels included in a division region. During this, the brightness data corresponding to the individual pixel may be obtained by directly averaging the RGB brightness data owned by the individual pixel or by multiplying the respective pieces of RGB data with a predetermined weighting coefficient to add the resultant values. Alternatively, the brightness data of any one color of RGB also may be directly used as pixel brightness data.

In Step S14, based on the division size set in Step S11, the quantization threshold value is determined that is used in the quantization processing carried out in Step S15. A method of determining the quantization threshold value will be described in detail later.

In Step S15, the quantization threshold value determined in Step S14 is used to quantize the average value calculated in Step S13 to have a binary value for each pixel. Specifically, when the average value calculated in Step S13 is compared with the quantization threshold value calculated in Step S14 and the former is higher than latter, then the quantization value is set to "1". When the former is not higher than latter, then the quantization value is set to "0". As a result, such quantization data is obtained that has the respective pixels have a uniform quantization value in each division region.

In Step S16, the quantization value obtained in Step S15 is added to addition image data. The addition image data is image data obtained by adding quantization data obtained in a case where division sizes and phases are variously different and has an initial value of 0. When the quantization data obtained in Step S15 represents the first phase of the first division size, then the addition image data obtained in Step S16 is equal to the quantization data obtained in Step S15.

Next, in Step S17, the CPU 301 determines whether or not the processing of all phases to the currently-set division size is completed. If it is determined that there remains a phase to be processed, then the processing returns to Step S12 to set the next phase. If it is determined that the processing of all phases is completed on the other hand, then the processing proceeds to Step S18.

FIGS. 8A to 8E and FIGS. 9A to 9J are a schematic view illustrating a process of sequentially performing the addition processing of Step S16 on all phases at a predetermined division size. When the division size is 2×2 pixels, there are four types of phases. FIGS. 8A to 8E show, in a process of sequentially changing these four types of phases, the number at which the brightness data of peripheral pixels is used for the addition processing of the target pixel Px for the respective pixels. When the division size is 3×3 pixels on the other hand, there are nine types of phases. FIGS. 9A to 9J show, in a process of sequentially changing these nine types of phases, the number at which the brightness data of peripheral pixels is used for the addition processing of the target pixel Px for the respective pixels.

In any of the drawings, the target pixel Px is used for all phases of the division region in which the target pixel Px itself is included. Thus, the target pixel Px has the highest addition number and the highest contribution to the addition result. A pixel more away from the target pixel Px has a smaller addition number and a smaller contribution to the addition result. Specifically, such a result is finally obtained that is obtained by subjecting the target pixel as a center to the filter processing.

Returning to the flowchart of FIG. 6, in Step S18, the image processing apparatus 1 determines whether or not the processing of all division sizes set in Step S3 is completed. If it is determined there remains a division size to be processed, then the processing returns to Step S11 to set the next division size. If it is determined that the processing of all division sizes set in Step S3 is completed on the other hand, the processing proceeds to Step S19.

In Step S19, the singular portion extraction processing is performed based on the currently-obtained addition image data. The extraction processing method is not particularly limited. For example, known decision processings can be used such as the one to compare the data with peripheral brightness data to extract a portion having a high signal value difference. Then, this processing is completed.

The information of the singular portion detected by the singular portion detection algorithm is displayed in a popped-up manner so that this can be used for the decision by the inspector. Then, the inspector confirms whether or not the portion is a defect portion based on the popped-up image. Thus, the defect portion can be repaired or can be excluded as a defective product.

Figure 10A:
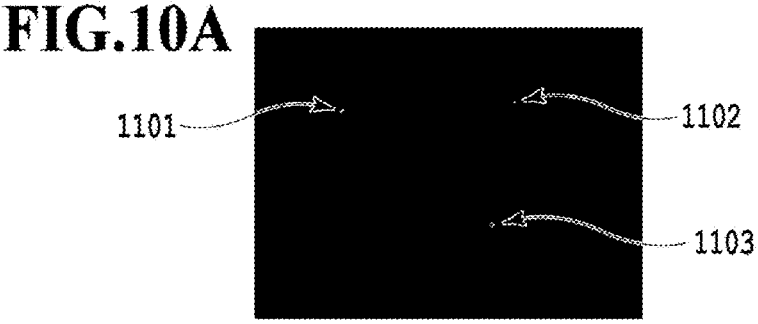
FIGS. 10A to 10D are a diagram to explain the effect of the singular portion detection processing.
Figure 10B:
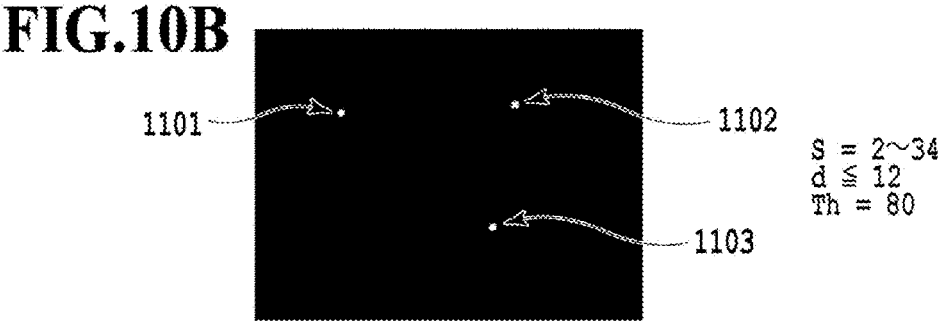
Figure 10C:
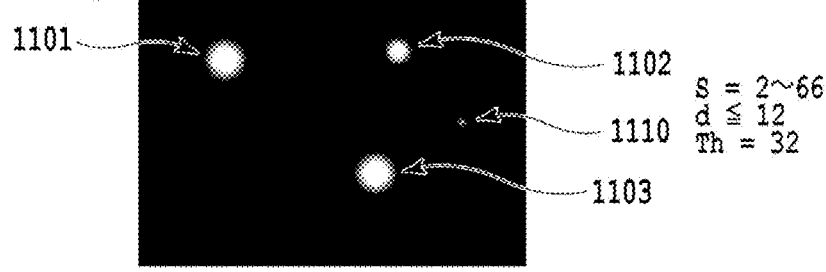
Figure 10D:
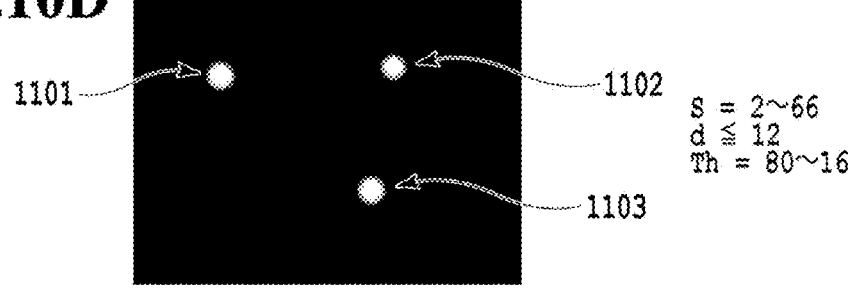

FIGS. 10A to 10D are a diagram to explain the singular portion detection processing of this embodiment. FIG. 10A illustrates original brightness image prior to being subjected to the singular portion detection processing. FIGS. 10B to 10D illustrate addition image data obtained by subjecting the image to the singular portion detection processing.

FIG. 10A shows an example in which there are three to-be-detected singular portions 1101, 1102, and 1103. However, the three singular portions 1101, 1102, and 1103 in the original brightness image are not so conspicuous, thus leaving a risk where the inspector does not recognize the three singular portions 1101, 1102, and 1103 as they are.

On the other hand, FIGS. 10B, 10C, and 10D show the result of the singular portion detection processing while using the division size, the phase, and the quantization threshold value Th that are mutually different from one another. FIG. 10B shows a case where the division size S is changed within a range from 2 to 34 pixels, the phase moving amount d is changed within a range equal to or less than 12 pixels, and the quantization threshold value Th is fixed to 80(/255). Although FIG. 10B shows the three singular portions at some exaggerated level, the level is insufficient to allow the inspector to easily detect the singular portions.

On the other hand, FIG. 10C shows a case where the division size S is changed within a range from 2 to 66 pixels, the phase moving amount d is changed within a range equal to or less than 12 pixels, and the quantization threshold value Th is fixed to 32(/255). As described in the Background Art section, an increase of the division region and a decrease of the quantization threshold value cause the singular portion to be exaggerated within the image. Thus, the singular portion is more conspicuous in the image in the case of the case of FIG. 10C where the division size is larger and the quantization threshold value T is smaller than in the case of FIG. 10B, thus allowing the inspector to easily detect the singular portion. However, in the case of FIG. 10C, noise 1110 not required to be extracted is unnecessarily exaggerated, which is visually recognized by the inspector. In this case, the inspector must make a judgmental decision about the noise 1110, which causes a decreased inspection efficiency.

The following section will describe the influence by the division size and the quantization threshold value on the singular portion within the image. In the quantization processing of Step S15, a smaller quantization threshold value Th allows the brightness value of the individual pixel to exceed the quantization threshold value Th more easily. Thus, the quantization value tends to be "1" (white), causing the singular portion to be exaggerated. Specifically, an excessively-small quantization threshold value Th causes even portions other than the singular portion to be more visually recognized by the inspector. An excessively-large quantization threshold value Th on the other hand causes even the singular portion to be less visually recognized by the inspector. Thus, the quantization threshold value Th is desirably set to an appropriate value depending on the brightness value that is considered to be owned by the pixels of the singular portion after the averaging processing.

In the averaging processing of Step S13 on the other hand, as described for FIGS. 8A to 8E and FIGS. 9A to 9J, the brightness value is averaged within the set division region. Thus, even when an arbitrary pixel does not include a singular portion, if the singular portion is included in other pixels of the same division region, the singular portion has an influence also on the arbitrary pixel. Specifically, an increase of the division size causes the influence by the singular portion to expand to a wider range and the singular portion within the image is increased. On the other hand, however, an increase of the division size reduces the difference in the brightness between the singular portion and not-singular portions and also reduces the brightness value of the singular portion after the averaging processing. Specifically, there is a risk of the decrease of the sensitivity of the singular portion extraction.

In view of the above, the present inventors have determined that the accurate extraction of the singular portion is effectively achieved by adjusting the quantization threshold value Th used in Step S15 depending on the division size set in the averaging processing of Step S13.

Figure 11:
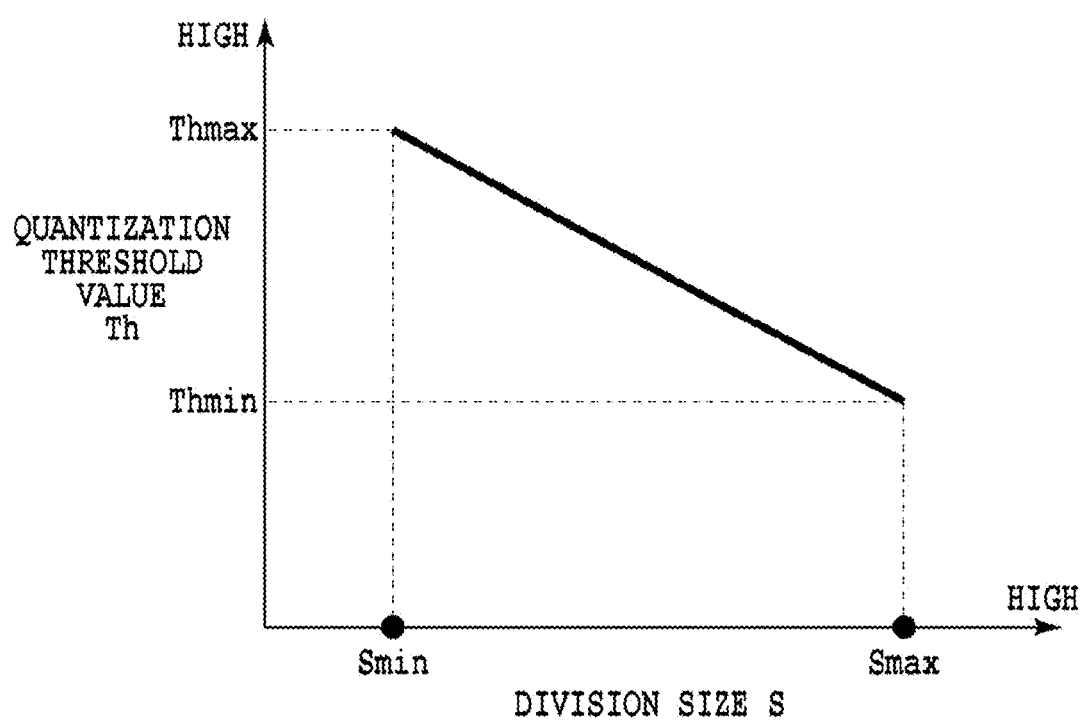
FIG. 11 illustrates the relation between a division size and a quantization threshold value.

FIG. 11 shows the relation between the division size and the quantization threshold value Th, in this embodiment. The division size S shows the length of one side (pixel number) when the division region has a square shape. The division size S and the quantization threshold value Th have the relation as shown in the drawing. Thus, an increase of the division size S causes a decrease of the quantization threshold value Th. By setting the threshold value quantization Th based on the relation shown in FIG. 11, the singular portion can be stably extracted without causing a decrease of the extraction sensitivity, even when a large division size S is set.

The maximum value Tmax and the minimum value Tmin of the quantization threshold value are already set in Step S3 of FIG. 5. The maximum value Tmax of the quantization threshold value is associated with the minimum value Smin of the division size and the minimum value Tmin of the quantization threshold value is associated with the maximum value Smax of the division size. In Step S14, based on these pieces of information, the function as shown in FIG. 11 may be calculated to calculate the individual quantization threshold value Th according to the function and the individual division size. Alternatively, a table showing the one-to-one correspondence between the division size S and the quantization threshold value Th may be prepared in advance and this table may be referred to thereby calculate the quantization threshold value Th based on the division size.

FIG. 10D shows the addition image data obtained after the singular portion extraction processing of this embodiment. Specifically, the division size S is changed within a range from 2 to 66 pixels, the phase moving amount d is changed within a range equal to or lower than 12 pixels, and the quantization threshold value Th is changed within a range from 80 to 16 depending on the division size so as to have the relation described for FIG. 11. The three singular portions 1101, 1102, and 1103 are sufficiently exaggerated when compared with the case of FIG. 10B and thus are easily visually recognized by the inspector. At the same time, the noise 1110 that is not required to be extracted is not exaggerated as shown in FIG. 10C. As a result, a target singular portion can be effectively detected without causing the extraction of a smaller-than-necessary defect or noise.

In the above description, a case has been described in which the information extracted in the singular portion extraction processing of Step S19 is displayed in a popped-up manner. However, the present invention is not limited to such an embodiment. For example, the information can be used for various applications such that a portion extracted as a singular portion may be automatically subjected to a repair processing.

Figure 12:
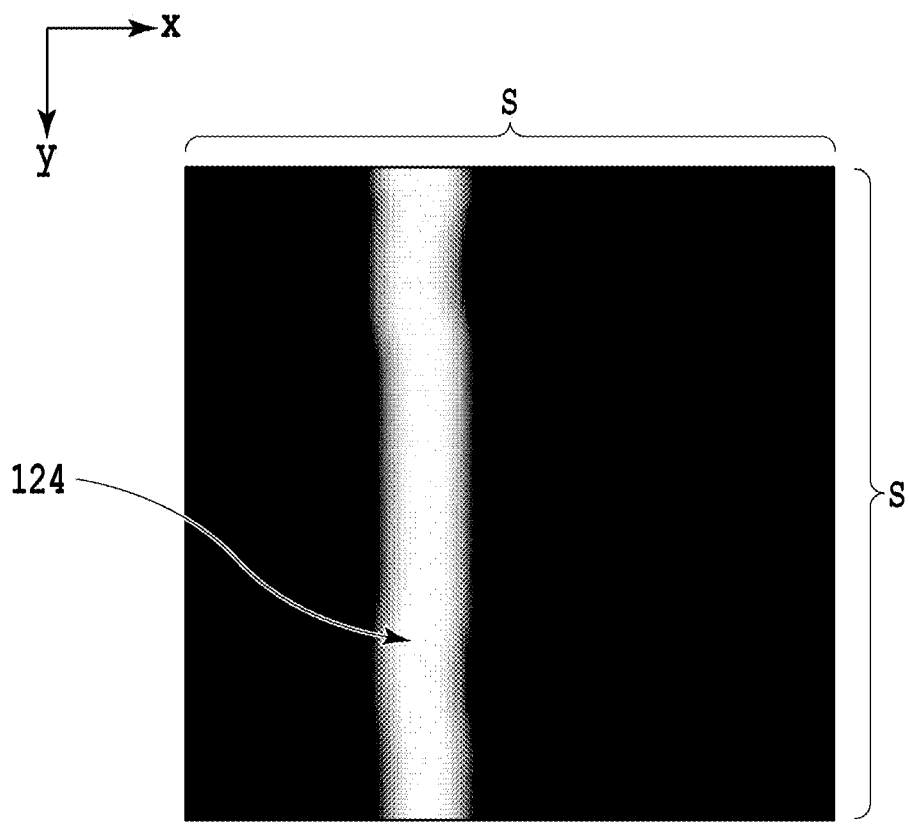
FIG. 12 illustrates a brightness pixel including a white stripe.

The following section will describe the specific set values of the division size and the quantization threshold value in a case where a defect in an image such as a white stripe caused by an ejection failure is extracted as a singular portion. FIG. 12 illustrates an original brightness image in a case where an ejection failure occurs and shows a division region including a white stripe 124. When a printing element of ejection failure is caused, then the image includes therein the white stripe 124 extending in the Y direction. The white stripe 124 has the width in the X direction that corresponds to the pitch at which the printing elements are arranged in the printing head and the width is about 40 to 50 μm. In this case, it is difficult to visually recognize the white stripe 124 in a printed image, thus, the singular portion detection algorithm of this embodiment is helpful.

Assuming that the white stripe 124 has a width of 40 to 50 μm in the X direction and the reading head 107 has a reading resolution of 600 dpi in the X direction, a region corresponding to the white stripe 124 in an image-taken brightness image has a width of 1 to 2 pixels in the X direction. Assuming that the visual recognition distance is 300 mm, a region corresponding to the white stripe 124 is preferably expanded to about 1 to 2 mm in order that the region can be visually recognized by the inspector. This size (pixel width R) corresponds to 23 to 47 pixels when the reading resolution of 600 dpi is used. When assuming that the division size used in the averaging processing of Step S13 is S, referring to FIGS. 8A to 8E and FIGS. 9A to 9J again, the information of the target pixel Px has an influence on a pixel region (2S−1) around the target pixel Px as a center. Specifically, in order to expand the information of the target pixel Px to 23 to 47 pixels, it is desirable that the above formula is backwardly calculated and the division size S is set to S=12 to 24 pixels.

Thus, in the case of this example, Step S3 of FIG. 5 sets a plurality of division sizes based on the minimum value Smin=12 and the maximum value Smax=24. Although the type of the division size is not particularly limited, a plurality of sizes are preferably set that are uniformly distributed between the minimum value Smin and the maximum value Smax. The above set value also may be changed to have a size further including a margin in consideration of the decrease of the brightness value caused by the blur during the object reading for example.

On the other hand, the quantization threshold value used in the quantization processing S15 after the averaging processing is preferably the average brightness value of a plurality of pixels existing in a division region including a singular portion or a value adjacent thereto. Referring to FIG. 12, a division region of S pixels×S pixels include a pixel included in the white stripe 124 and a pixel not included in the white stripe 124. Assuming that the brightness value of a pixel included in the white stripe 124 is f(n) and the number thereof is A and the brightness value of a pixel not included in the white stripe 124 is g(m) and the number thereof is B, then the division region has an average brightness value that can be represented by the formula 1.

$$Th(S) = \frac{\sum_{n=1}^{A} f(n) + \sum_{m=1}^{B} g(m)}{S \times S}$$ (Formula 1)

As described above, the average brightness value appropriate as a quantization threshold value can be represented as a function of the division size S. Thus, by calculating in advance a value corresponding to the numerator of the formula 1 based on the image including the white stripe, Step S14 of FIG. 6 can calculate the quantization threshold value Th suitable for the division size S using the formula 1. By storing in advance a table showing the one-to-one correspondence between the division size S and the quantization threshold value Th based on the above formula 1, Step S14 can refer to this to thereby set the quantization threshold value Th. The numerator of the formula 1 is preferably set to have a value including a margin in consideration of the blur or a variation of the brightness value, during the object reading.

However, the division size S and the quantization threshold value Th do not always have to satisfy the formula 1. The formula 1 also can be substituted with an approximation formula having a linear relation so long as a relation can be established according to which an increase of the division size causes a decrease of the quantization threshold value Th.

Second Embodiment

In this embodiment, the image processing apparatus 1 described for FIGS. 2 to 4B is similarly used to detect a singular portion based on the basic steps of FIG. 5. In this embodiment however, the following section will describe a method of extracting, from an image-taken brightness image, a plurality of types of singular points having different features. A plurality types of singular points illustratively include, in addition to the white stripes, ink omission, and a surface flaw.

Figure 13A:
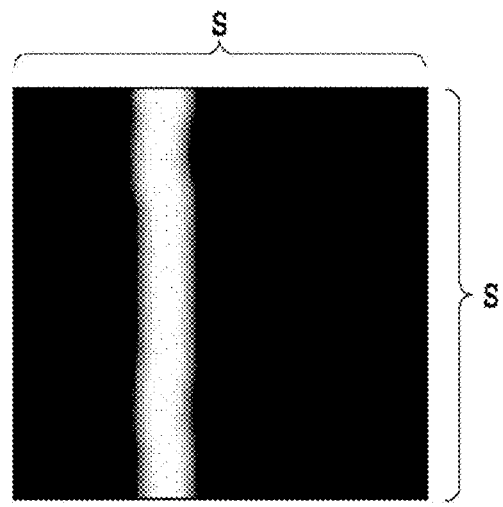
FIGS. 13A to 13C illustrate a brightness pixel including a white stripe, ink omission, and a surface flaw.
Figure 13B:
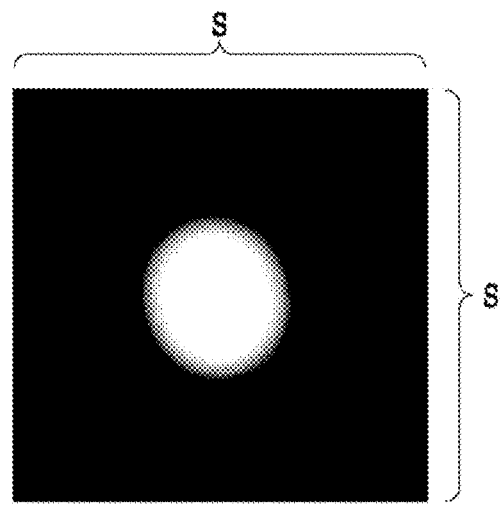
Figure 13C:
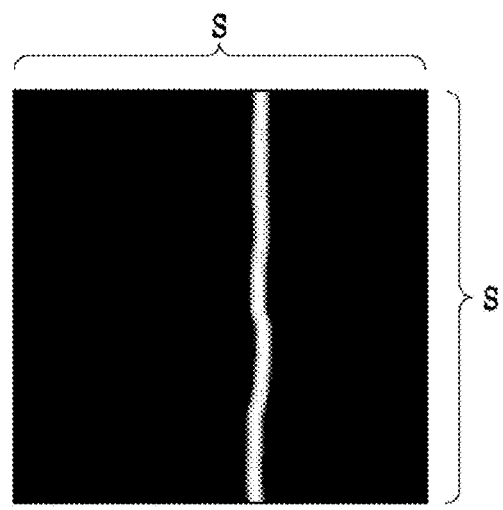

FIGS. 13A to 13C show brightness images in a case where the white stripe, the ink omission, and the surface flaw are caused, respectively. FIG. 13A shows the brightness image in a case where the white stripe occurs as already described for FIG. 12.

FIG. 13B shows the brightness image in a case where the ink omission occurs. The ink omission means a phenomenon in which ink is applied to dust for example attached on a printing medium and the attached matter subsequently drops from the printing medium. Only a region in which the matter was once attached has a high lightness. Most of the attached matters are paper dust caused by a step of cutting a paper during a sheet manufacture operation for example and have various sizes. In this example, the ink omission of about 100 to 150 µm is extracted as a singular portion.

FIG. 13C shows the brightness image in a case where a surface flaw occurs. The surface flaw is a phenomenon in which a flaw occurs on an image because a printing medium being conveyed has a contact with a part of a component or minute dust attached to a conveying roller for example. The surface flaw tends to be disadvantageous in the case of a glossy paper for example. The surface flaw has various sizes. In this example, the surface flaw of 10 to 20 µm is extracted as a singular portion.

In this embodiment, a singular portion is similarly detected based on the basic steps of FIG. 5. However, since there are singular portions having various sizes depending on the types thereof, Step S3 of this embodiment sets division sizes, phases, and quantization threshold values while being associated with the singular portion type.

Figure 14:
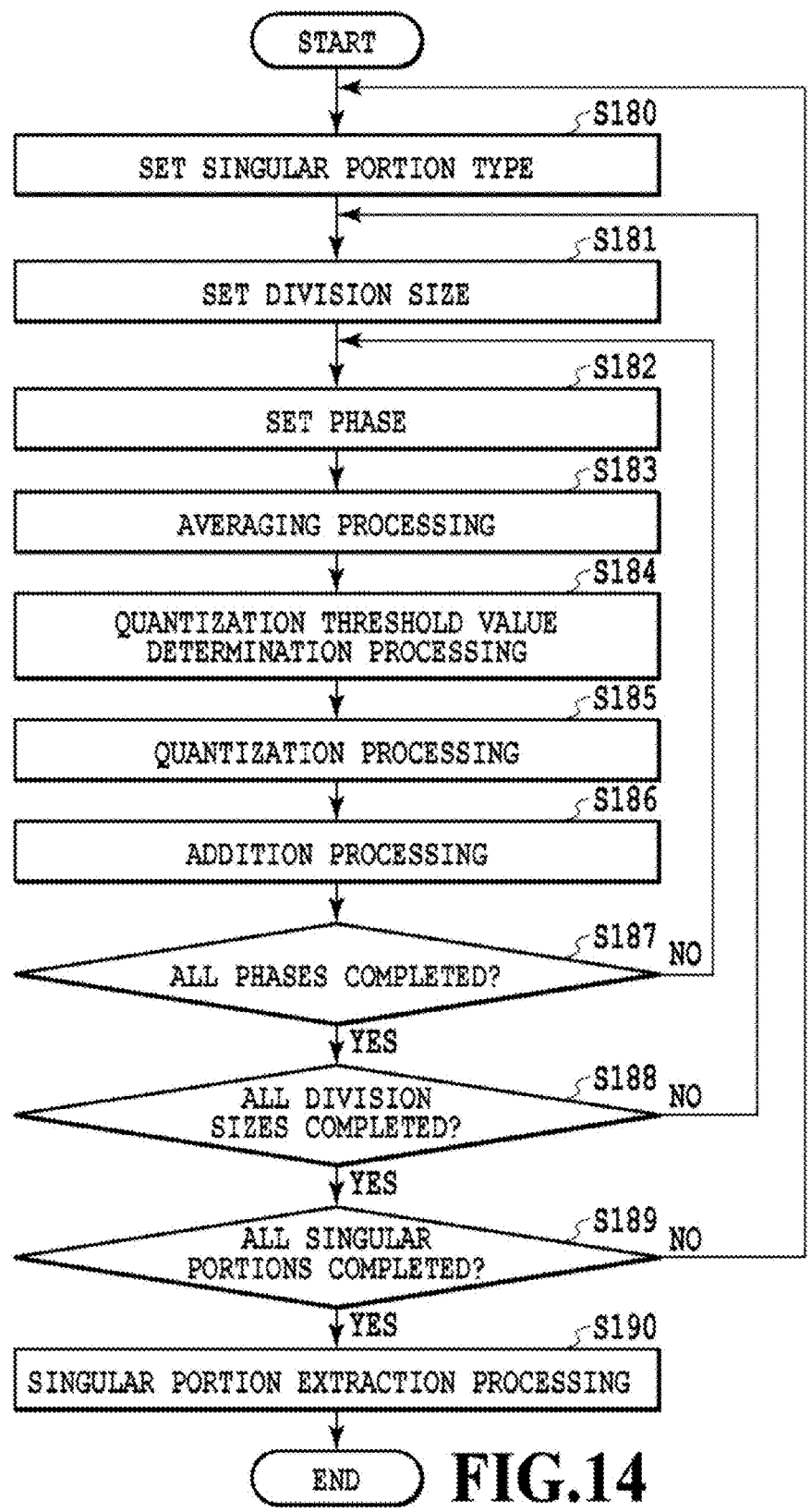
FIG. 14 is a flowchart to explain the steps of the singular portion detection algorithm.

FIG. 14 is a flowchart to explain the steps of the singular portion detection algorithm executed by the CPU 301 of this embodiment in Step S4. When this processing is started, the CPU 301 firstly sets, in Step S180, the types of a to-be-extracted singular portion. Specifically, any of the white stripe, the ink omission, and the surface flaw is set.

In Step S181, the CPU 301 sets one division size from among a plurality of division sizes set in advance associated with the types of singular portions set in Step S180. Then, Step S182 sets one phase similarly from among a plurality of phases set in advance associated with the types of singular portions. Then, Step S183 divides the image data acquired in Step S2 based on the division size set in Step S181 and the phase set in Step S182 to perform the averaging processing.

In Step S184, the CPU 301 determines the quantization threshold value Th used in the quantization processing of Step S185 based on the type of the singular portion set in Step S180 and the division size set in Step S181. That is, in this embodiment, the quantization threshold value Th used in the quantization processing is different depending not only on the division size but also on the singular portion type. The relation among the division size, the singular portion type, and the quantization threshold value in this embodiment will be described in detail later.

Thereafter, the processing of Steps S185 to S188 are similar to Steps S15 to S18 of FIG. 6. In Step S189, the CPU 301 determines whether or not the processings for all types of singular portions (i.e., the white stripe, the ink omission, the surface flaw) are completed. If it is determined that these processings are not yet completed, then the processing returns to Step S180 for the next type of singular portions. If it is determined that the processings for all singular portions are completed, then the processing proceeds to Step S190 to perform the singular portion extraction processing.

The singular portion extraction processing is basically the same as Step S19 of the first embodiment. Regarding different types of singular portions, processed images may be presented for the respective types or the images of the respective different types may be displayed together. Then, this processing is completed.

The following section will describe, while referring again to FIGS. 13A to 13C, the division size and the quantization threshold value appropriate for the respective types of singular portions. Here, the white stripe of 40 to 50 µm, the ink omission of about 100 to 150 µm, and the surface flaw of 10 to 20 µm are extracted through a common reading operation. Thus, the reading head 107 has a reading resolution set to 1200 dpi. In this case, a brightness image includes therein a white stripe having a size (or a width) of 2 to 3 pixels, an ink omission having a size (or a width) of 5 to 7 pixels, and a surface flaw having a size (or a width) of 1 to 2 pixel(s). In this embodiment, with regard to any of them, a formula showing the relation between the division size and the quantization threshold value Th is calculated based on the formula 1.

Figure 15:
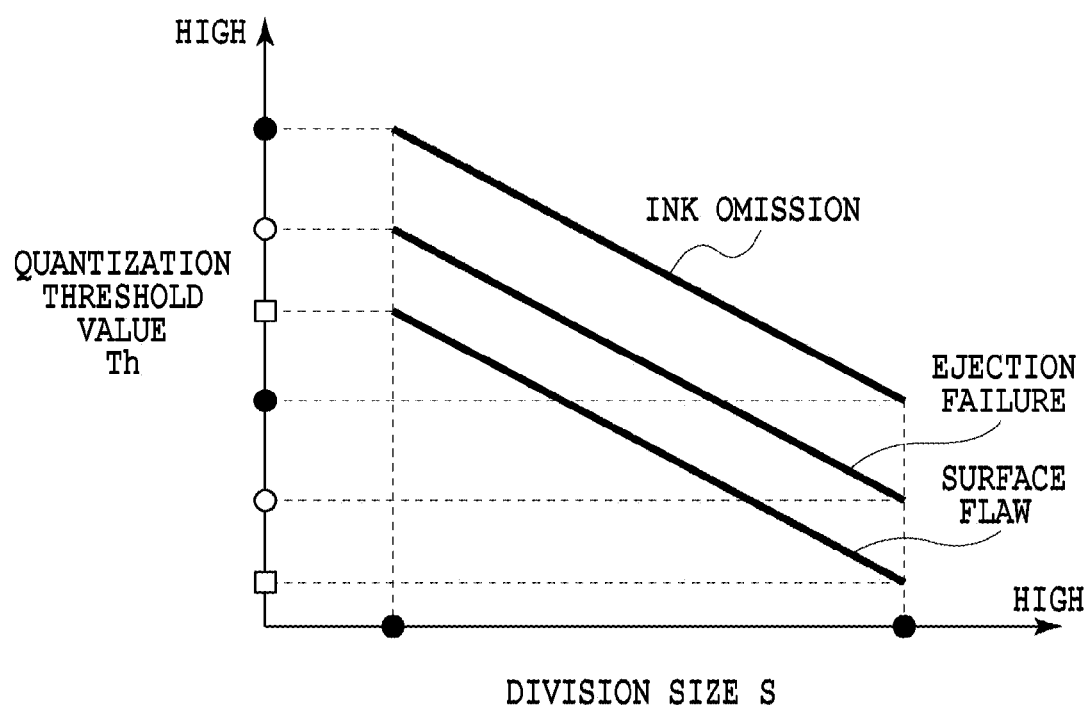
FIG. 15 shows the relation between a division size and a quantization threshold value for each singular portion type.

FIG. 15 illustrates the relation between such a division size and the quantization threshold value Th for each type of a singular portion. As in the first embodiment, an increase of the division size causes a decrease of the quantization threshold value. However, the value is different depending on the type of the singular portion. Specifically, such an ink omission that has the highest pixel number corresponding to the singular portion region is set to have the highest quantization threshold value Th. Such a surface flaw that has the lowest pixel number corresponding to the singular portion region is set to have the lowest quantization threshold value Th. In this embodiment, the division size may be set for each type of a singular portion so that any singular portion is expanded to about 1 to 2 mm while maintaining the relation between the division size S and the quantization threshold value Th as described above.

In the above section, an image read by a 1200 dpi reading resolution is subjected sequentially to the singular portion detection algorithms for the respective types of singular portions. However, this embodiment is not limited to such an embodiment. A reading operation also can be performed for each type of a singular portion and an independent brightness image can be prepared for each type of a singular portion. In this case, for the purpose of providing a processing having a higher speed, the ink omission for example may be subjected to a reading operation at a resolution lower than those used for the white stripe and the surface flaw. In this case, appropriate division size and quantization threshold value have a different value depending on the reading resolution.

As described above, according to this embodiment, even when there are a plurality of singular portions having different features, the division sizes and quantization threshold values appropriate for the respective singular portions can be set. As a result, a plurality of singular portions having different features can be effectively detected without causing the extraction of smaller-than-necessary defect or noise.

Third Embodiment

In the above embodiment, as described for the flowcharts of FIG. 6 and FIG. 14, the addition result of average values was calculated for a plurality of phases of the division size. The processing as described above provides such a result that is obtained by subjecting a target pixel as a center to a filter processing, as described using FIGS. 8A to 8E and FIGS. 9A to 9J. In view of the point as described above, this embodiment substitutes the addition processing of a plurality of phases for equal division sizes with a processing to add a weighting coefficient using a Gaussian filter.

Figure 16A:
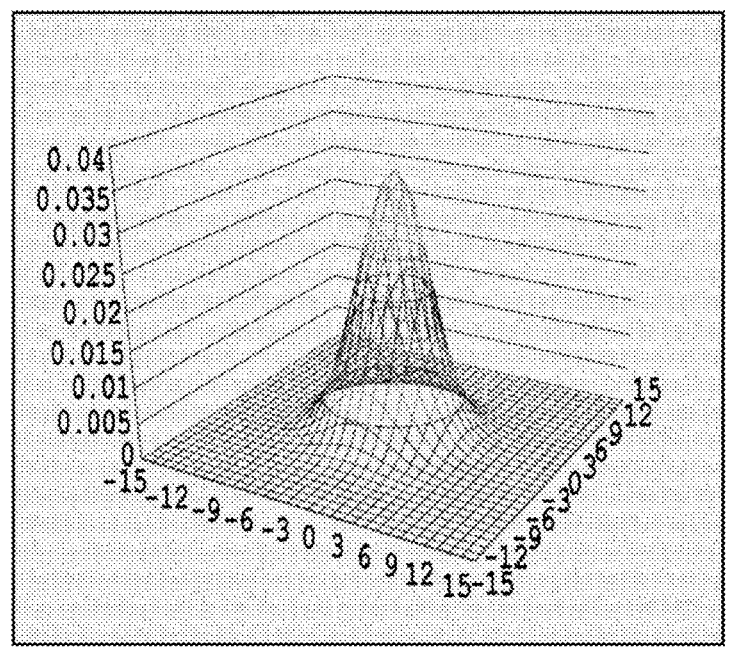
FIGS. 16A and 16B illustrate one example of a Gaussian filter.
Figure 16B:
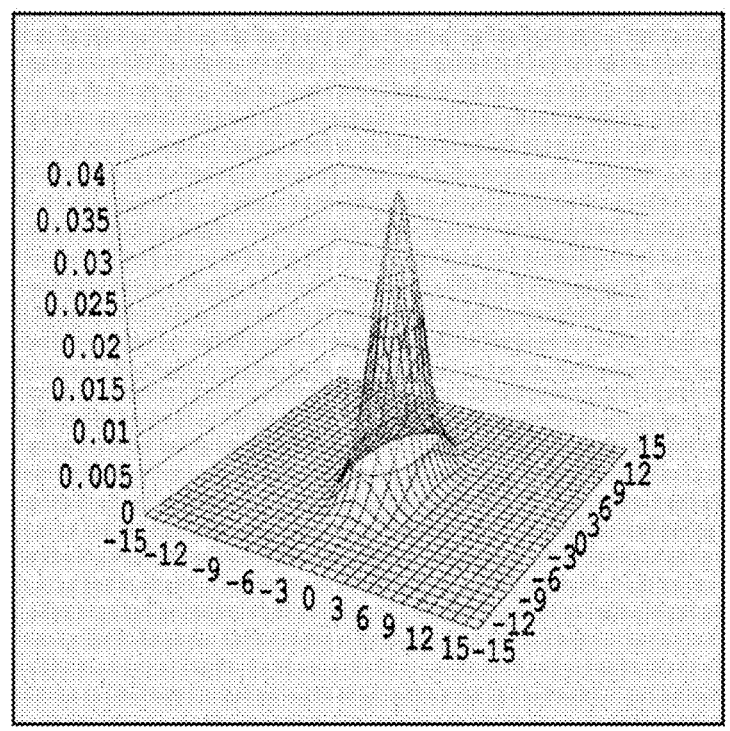

FIGS. 16A and 16B show one example of a Gaussian filter. FIG. 16A shows an isotropic Gaussian filter that can be represented by the Formula 2.

$$f(x, y) = \frac{1}{2\pi\sigma^2} \exp\left(-\frac{x^2 + y^2}{2\sigma^2}\right) \quad \text{(Formula 2)}$$

In the formula, x and y denote the pixel number from a target pixel and σ shows a standard deviation.

The isotropic Gaussian filter as described above corresponds to a case where a square division size such as 2×2 or 3×3 is used in the first embodiment. FIG. 16B shows an anisotropic Gaussian filter that corresponds to a case where a rectangular division size such as 2×3 is used in the first embodiment. The anisotropic Gaussian filter as described above can be generated by the Formula 2 by providing an uneven ratio between x and y. For example, FIG. 16B corresponds to a case where the x of the Formula 2 is substituted with x'=x/2. In this embodiment, any Gaussian filter can be used. However, the following description will be made based on a case where the isotropic Gaussian filter shown in FIG. 16A is used as an example.

The Gaussian filter of FIG. 16A shows the coefficients of the individual pixels positioning within the ranges of −15≤X≤15 and 15≤Y≤15 around a target pixel as an original point. An embodiment in which the coefficients are set within the ranges of −15≤X≤15 and 15≤Y≤15 as described above is similar to the first embodiment in which the division size is set to 15×15 and the addition processing as in FIGS. 8A to 8E and FIGS. 9A to 9J is performed. Specifically, when assuming that the Gaussian filter has a size (diameter) F and the division size in the first embodiment is V×V, then the following can be represented.

$$F \approx 2V - 1$$

By adjusting this Gaussian filter size F together with the standard deviation a, Gaussian filters of various sizes can be prepared. In this embodiment, one Gaussian filter is used to subject the brightness data of the target pixel to a filter processing as described above and the resultant data is further quantized. Further, a plurality of the quantized data are calculated for a plurality of Gaussian filters having different sizes and add the plurality of the quantized data. This can consequently provide the singular portion detection processing based on the addition result similar to the addition result in the first embodiment.

Figure 17:
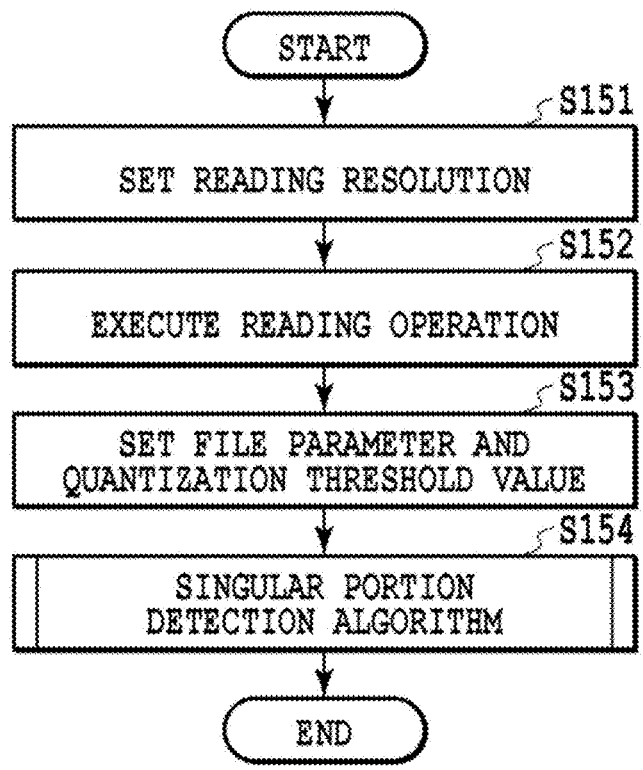
FIG. 17 is a flowchart of the singular portion detection processing in the second embodiment.

In this embodiment, the image processing apparatus 1 also can take various forms as described for FIGS. 1A to 1D. FIG. 17 shows a basic flowchart of the singular portion detection processing carried out by the CPU 301 of the image processing apparatus 1 of this embodiment. When this processing is started, the CPU 301 sets the reading resolution in Step S151. Next, in Step S152, an operation to read the inspection target is carried out. The above Step S151 and Step S152 are similar to Step S1 and Step S2 of FIG. 5.

In Step S153, the CPU 301 sets a plurality types of file parameters of a Gaussian filter used in the singular portion detection algorithm executed in the subsequent Step S154 and a quantization threshold value. The file parameters are parameters to specify the direction of the Gaussian function as described for FIGS. 16A and 16B and a different filter size F. Regarding the quantization threshold value, two values of the maximum value and the minimum value are set. In Step S154, based on the file parameters set in Step S153, the image data generated in Step S152 is subjected to a predetermined singular portion detection algorithm.

Figure 18:
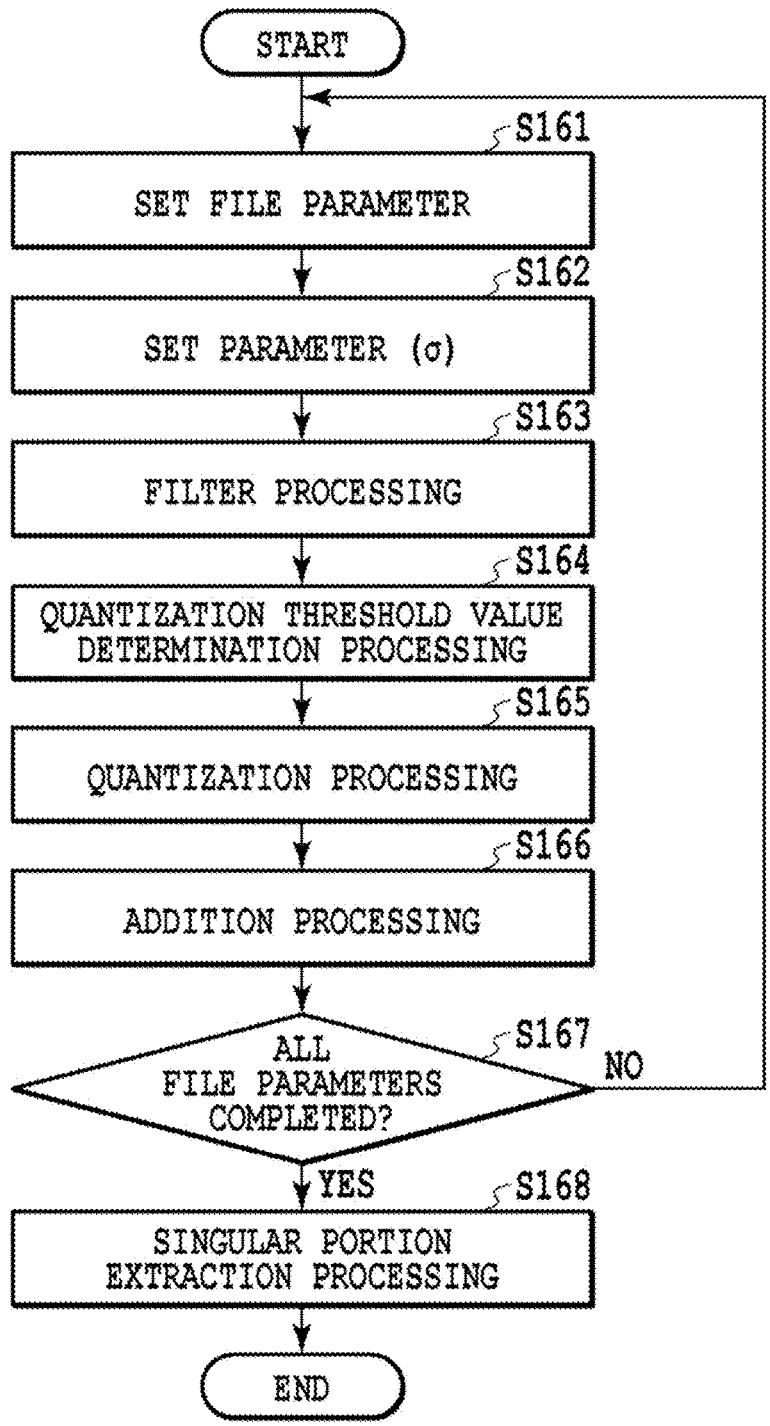
FIG. 18 is a flowchart to explain the steps of the singular portion detection algorithm.

FIG. 18 is a flowchart to explain the steps of the singular portion detection algorithm executed by the CPU 301 in Step S154. The shown processing is performed on the individual pixels of the image acquired in Step S152.

When this processing is started, the CPU 301 firstly sets, in Step S161, one file parameter from among a plurality of file parameters set in Step S153. In Step S162, a parameter σ corresponding to the file parameter set in Step S161 is set. The parameter σ corresponds to the standard deviation of the Gaussian function and is stored in a memory in advance while being associated with a file parameter or a filter size. The shape of the Gaussian filter is determined by the setting of the file parameter and the parameter σ in Steps S161 and S162.

Next, in Step S163, the Gaussian filter set in Steps S161 and S162 is used to subject the image data acquired in Step S152 to the filter processing. Specifically, the brightness data owned by the target pixel and the peripheral pixels included in the filter size F are multiplied with a coefficient set by the Gaussian filter and the resultant values are added, the result of which is calculated as the filter processing value Ave of the target pixel.

Step S164 determines, based on the filter size set in Step S161, the quantization threshold value used in the quantization processing executed in the subsequent Step S165.

Figure 19:
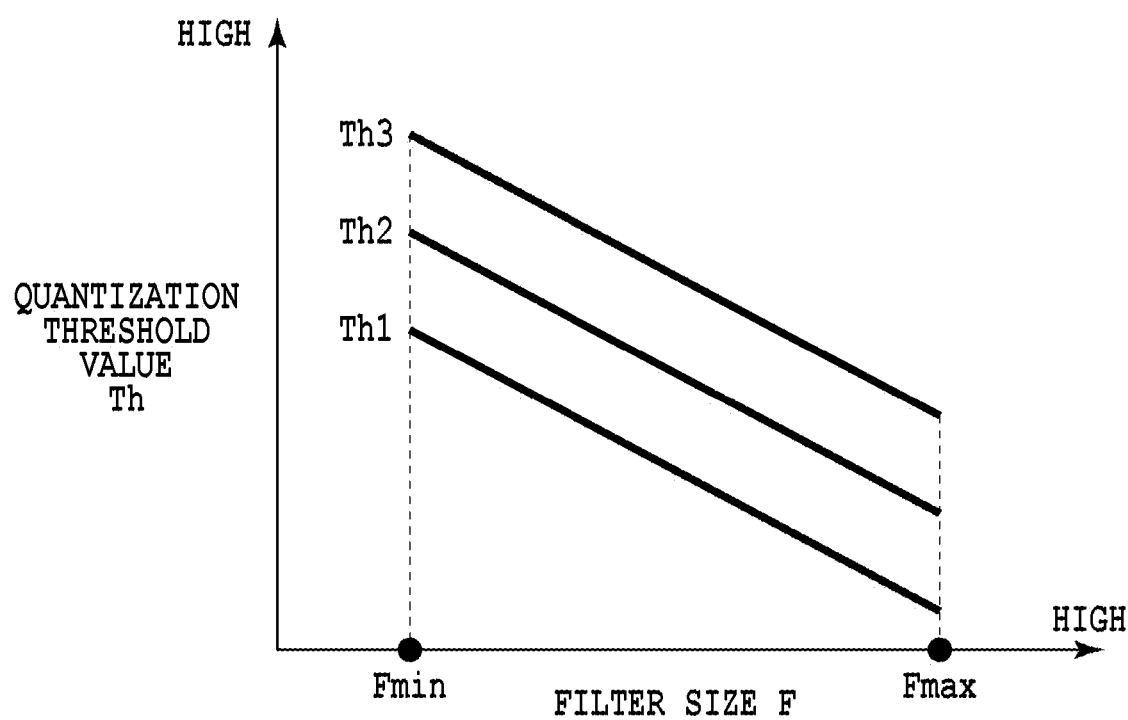
FIG. 19 illustrates the relation between the filter size and the quantization threshold value.

FIG. 19 shows the relation between the filter size F and the quantization threshold value Th. As in the first embodiment, an increase of the filter size F causes a decrease of the quantization threshold value Th. However, since this embodiment performs a four-valued quantization processing, one filter size F has three stages of quantization threshold values Th1, Th2, and Th3. These threshold values Th1, Th2, and Th3 have the maximum values and minimum values already set in Step S153 of FIG. 17. Step S164 may subject these pieces of information to a linear interpolation for example to calculate the quantization threshold values Th1, Th2, and Th3 corresponding to the individual filter sizes.

In Step S165, the CPU 301 compares the filter processing value Ave calculated in Step S163 with Th1, Th2, and Th3 to quantize the filter processing value and obtain four-valued quantization value for the respective pixels. Specifically, the following determination is made.

When Ave>Th3 is established, the quantization value is "3".

When Th3≥Ave>Th2 is established, the quantization value is "2".

When Th2≥Ave>Th1 is established, the quantization value is "1". When Th1≥Ave is established, the quantization value is "0".

As described above, in this embodiment, a plurality of quantization threshold values are prepared to thereby perform a 3-valued or more quantization processing.

Next, in Step S166, the quantization value obtained in Step S165 is added to the addition image data. The addition image data shows the result obtained by adding quantization data obtained in the respective cases where various types of the file parameters (i.e., Gaussian filters) are used. When the quantization data obtained in Step S164 is the result of the first Gaussian filter, then the addition image data is equal to the quantization data obtained in Step S164.

Next, in Step S167, the CPU 301 determines whether or not the processing for all file parameters set in Step S153 is completed. When it is determined that there remains a to-be-processed file parameter, then the processing returns to Step S161 to set the next file parameter. When it is determined that the processing of all file parameters is completed on the other hand, the processing proceeds to Step S168.

In Step S168, the singular portion extraction processing is performed based on the currently-obtained addition image data. As in the first embodiment, the extraction method is not particularly limited. Then, this processing is completed.

The above-described embodiment is similar to the first embodiment in that a target singular portion can be effectively detected without causing the extraction of smaller-than-necessary defect or noise.

Other Embodiments

In the above embodiments, the full line-type inkjet printing apparatus shown in FIG. 3 was used as an example of an embodiment in which an image printed by the multifunction machine 6 is subjected to a reading processing by the same multifunction machine. However, the present invention is not limited to this application. The invention also can be applied to a printing inspection for another inkjet method in which a carriage has thereon a printing head.

Furthermore, the present invention also can provide a processing according to which a program for realizing one or more functions of the above-described embodiment is supplied via a network or a storage medium to a system or an apparatus so that one or more processors in a computer of the system or the apparatus can read and execute the program. The invention also can be realized by a circuit (e.g., ASIC) realizing one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-089928 filed Apr. 27, 2016, which is hereby incorporated by reference wherein in its entirety.

What is claimed is:

1. An image processing apparatus, comprising:
an acquisition unit configured to acquire image data having a plurality of pixels, that is obtained by image-taking an object;
a setting unit configured to set a division size for dividing the image data to a plurality of division regions and a phase of a division position of the image data before the dividing;
an averaging unit configured to divide the image data based on the division size and phase set by the setting unit to subject pixels included in the resultant respective division regions to an averaging processing to calculate an average value;
a determination unit configured to determine a quantization threshold value based on the division size set by the setting unit;
a quantization unit configured to obtain a quantization value for each of the plurality of pixels by comparing the average value calculated by the averaging unit with the quantization threshold value determined by the determination unit;
an addition unit configured to add the quantization values, that are obtained so that at least one of the division size and the phase is different from the other, to generate addition image data; and
a detection unit configured to detect a singular portion in the addition image data,
wherein
the determination unit determines the quantization threshold value so that the quantization threshold value in a case where the division size is a first size is higher than the quantization threshold value in a case where the division size is a second size larger than the first size.

2. The image processing apparatus according to claim 1, wherein, assuming that a minimum pixel width of the singular portion that can be confirmed in displaying the addition image data is R, and maximum value of the division size at which the setting unit can set is Smax, the following formula is established;

$$R = Smax \times 2 - 1.$$

3. The image processing apparatus according to claim 1, wherein
the setting by the setting unit, the averaging processing by the averaging unit, the determination by the determination unit, the quantization processing by the quantization unit, and the generation of the addition image data by the addition unit are performed on the same image data acquired by the acquisition unit in an independent manner for each type of a singular portion to be detected by the detection unit; and
the determination unit determines the quantization threshold value having a different value depending on the type of the singular portion.

4. The image processing apparatus according to claim 1, wherein
the acquisition unit adjusts a reading resolution used to image-take the object depending on a type of a singular portion to be detected by the detection unit to acquire the image data for each type of the singular portion;

the setting by the setting unit, the averaging processing by the averaging unit, the determination by the determination unit, the quantization processing by the quantization unit, and the generation of the addition image data by the addition unit are performed in an independent manner on image data of each type of the singular portion acquired by the acquisition unit;

the determination unit sets the quantization threshold value having a different value depending on the type of the singular portion.

5. The image processing apparatus according to claim 1, further comprising a unit configured to image-taking the object.

6. The image processing apparatus according to claim 1, wherein the object is an image printed by an inkjet printing apparatus and the singular portion is a defective portion in the image.

7. An image processing apparatus, comprising:
an acquisition unit configured to acquire image data having a plurality of pixels, that is obtained by image-taking an object;
a setting unit configured to set a filter size and a filter parameter for subjecting the image data to a predetermined filter processing;
a filter processing unit configured to subject, based on the filter size and filter parameter set by the setting unit, the image data to the predetermined filter processing to calculate a processing value;
a determination unit configured to determine a quantization threshold value based on the filter size set by the setting unit;
a quantization unit configured to obtain a quantization value for each of the plurality of pixels by comparing the processing value calculated by the filter processing unit with the quantization threshold value determined by the determination unit;
an addition unit configured to add the quantization values, that are obtained so that at least one of the filter size and the filter parameter is different from the other, to generate addition image data; and
a detection unit configured to detect a singular portion from the addition image data,
wherein
the determination unit determines the quantization threshold value so that the quantization threshold value in a case where the filter size is a first size is higher than the quantization threshold value in a case where the filter size is a second size larger than the first size.

8. The image processing apparatus according to claim 7, wherein the predetermined filter processing is a processing using a Gaussian filter.

9. The image processing apparatus according to claim 7, wherein
the determination unit determines a plurality of the quantization threshold values based on the filter size set by the setting unit and the quantization unit compares the processing value with the plurality of quantization threshold values to thereby acquire 3-valued or more quantization value for each of the plurality of pixels.

10. The image processing apparatus according to claim 7, further comprising a unit configured to image-taking the object.

11. An image processing method, comprising:
an acquisition step of acquiring image data having a plurality of pixels, that is obtained by image-taking an object;
a setting step of setting a division size for dividing the image data to a plurality of division regions and a phase of a division position of the image data before the dividing;
an averaging step of dividing the image data based on the division size and phase set by the setting step to subject pixels included in the resultant respective division regions to an averaging processing to calculate an average value;
a determination step of determining a quantization threshold value based on the division size set by the setting step;
a quantization step of obtaining a quantization value for each of the plurality of pixels by comparing the average value calculated by the averaging step with the quantization threshold value determined by the determination step;
an addition step of adding the quantization values, that are obtained so that at least one of the division size and the phase is different from the other, to generate addition image data; and
a detection step of detecting a singular portion from the addition image data,
wherein
the determination step determines the quantization threshold value so that the quantization threshold value in a case where the division size is a first size is higher than the quantization threshold value in a case where the division size is a second size larger than the first size.

12. The image processing method according to claim 11, wherein assuming that a minimum pixel width of the singular portion that can be confirmed in displaying the addition image data is R, and maximum value of the division size at which the setting unit can set is Smax, the following formula is established;

$$R = S\max \times 2 - 1.$$

13. The image processing method according to claim 11, wherein
the setting by the setting step, the averaging processing by the averaging step, the determination by the determination step, the quantization processing by the quantization step, and the generation of the addition image data by the addition step are performed on the same image data acquired by the acquisition step in an independent manner for each type of a singular portion to be detected by the detection step; and
the determination step determines the quantization threshold value having a different value depending on the type of the singular portion.

14. The image processing method according to claim 11, wherein
the acquisition step adjusts a reading resolution used to image-take the object depending on a type of a singular portion to be detected by the detection step to acquire the image data for each type of the singular portion;
the setting by the setting step, the averaging processing by the averaging step, the determination by the determination step, the quantization processing by the quantization step, and the generation of the addition image data by the addition step are performed in an independent manner on image data of each type of the singular portion acquired by the acquisition step; and
the determination step sets the quantization threshold value having a different value depending on the type of the singular portion.

15. The image processing method according to claim 11, further comprising a step of image-taking the object.

16. The image processing method according to claim 11, wherein the object is an image printed by an inkjet printing apparatus and the singular portion is a defective portion in the image.

17. An image processing method, comprising:
an acquisition step of acquiring image data having a plurality of pixels, that is obtained by image-taking an object;
a setting step of setting a filter size and a filter parameter for subjecting the image data to a predetermined filter processing;
a filter processing step of subjecting, based on the filter size and filter parameter set by the setting step, the image data to the predetermined filter processing to calculate a processing value;
a determination step of determining a quantization threshold value based on the filter size set by the setting step;
a quantization step of obtain a quantization value for each of the plurality of pixels by comparing the processing value calculated by the filter processing step with the quantization threshold value determined by the determination step;
an addition step of adding the quantization values, that are obtained so that at least one of the filter size and the filter parameter is different from the other, to generate addition image data; and
a detection step of detecting a singular portion from the addition image data,
wherein
the determination step determines the quantization threshold value so that the quantization threshold value in a case where the filter size is a first size is higher than the quantization threshold value in a case where the filter size is a second size larger than the first size.

18. The image processing method according to claim 17, wherein the predetermined filter processing is a processing using a Gaussian filter.

19. The image processing method according to claim 17, wherein
the determination step determines a plurality of the quantization threshold values based on the filter size set by the setting step and the quantization step compares the processing value with the plurality of quantization threshold values to thereby acquire 3-valued or more quantization value for each of the plurality of pixels.

20. A non-transitory computer-readable storage medium which stores a program for allowing a computer to function as an image processing apparatus, the image processing apparatus comprising:
an acquisition unit configured to acquire image data having a plurality of pixels that is obtained by image-taking an object;
a setting unit configure to set a division size for dividing the image data to a plurality of division regions and a phase of a division position of the image data before the dividing;
an averaging unit configured to divide the image data based on the division size and phase set by the setting unit to subject pixels included in the resultant respective division regions to an averaging processing to calculate an average value;
a determination unit configured to determine a quantization threshold value based on the division size set by the setting unit;
a quantization unit configured to obtain a quantization value for each of the plurality of pixels by comparing the average value calculated by the averaging unit with the quantization threshold value determined by the determination unit;
an addition unit configured to add the quantization values, that are obtained so that at least one of the division size and the phase is different from the other, to generate addition image data; and
a detection unit configured to detect a singular portion from the addition image data,
wherein
the determination unit determines the quantization threshold value so that the quantization threshold value in a case where the division size is a first size is higher than the quantization threshold value in a case where the division size is a second size larger than the first size.

21. The non-transitory computer-readable storage medium according to claim 20, wherein, assuming that a minimum pixel width of the singular portion that can be confirmed in displaying the addition image data is R, and maximum value of the division size at which the setting unit can set is Smax, the following formula is established;

$$R = Smax \times 2 - 1.$$

22. The non-transitory computer-readable storage medium according to claim 20, wherein
the setting by the setting unit, the averaging processing by the averaging unit, the determination by the determination unit, the quantization processing by the quantization unit, and the generation of the addition image data by the addition unit are performed on the same image data acquired by the acquisition unit in an independent manner for each type of a singular portion to be detected by the detection unit; and
the determination unit determines the quantization threshold value having a different value depending on the type of the singular portion.

23. The non-transitory computer-readable storage medium according to claim 20, wherein
the acquisition unit adjusts a reading resolution used to image-take the object depending on a type of a singular portion to be detected by the detection unit to acquire the image data for each type of the singular portion;
the setting by the setting unit, the averaging processing by the averaging unit, the determination by the determination unit, the quantization processing by the quantization unit, and the generation of the addition image data by the addition unit are performed in an independent manner on image data of each type of the singular portion acquired by the acquisition unit; and
the determination unit sets the quantization threshold value having a different value depending on the type of the singular portion.

24. The non-transitory computer-readable storage medium according to claim 20, wherein the image processing apparatus further comprising a unit configured to image-taking the object.

* * * * *